United States Patent
Hendrickson et al.

(10) Patent No.: US 10,277,693 B2
(45) Date of Patent: Apr. 30, 2019

(54) TREND DETECTION IN A MESSAGING PLATFORM

(71) Applicant: Twitter, Inc., San Francisco, CA (US)

(72) Inventors: Scott Hendrickson, Brighton, CO (US); Jeffrey Aaron Kolb, Denver, CO (US); Joshua Montague, Golden, CO (US); Brian Lehman, Boulder, CO (US)

(73) Assignee: Twitter, Inc., San Francisco, CA (US)

( * ) Notice: Subject to any disclaimer, the term of this patent is extended or adjusted under 35 U.S.C. 154(b) by 181 days.

(21) Appl. No.: 15/174,853

(22) Filed: Jun. 6, 2016

(65) Prior Publication Data

US 2016/0359993 A1     Dec. 8, 2016

Related U.S. Application Data

(60) Provisional application No. 62/170,966, filed on Jun. 4, 2015.

(51) Int. Cl.
| | | |
|---|---|---|
| *H04L 12/00* | (2006.01) | |
| *G06F 17/30* | (2006.01) | |
| *H04L 29/08* | (2006.01) | |
| *H04L 12/58* | (2006.01) | |

(52) U.S. Cl.
CPC .......... *H04L 67/22* (2013.01); *G06F 17/3053* (2013.01); *G06F 17/30864* (2013.01); *H04L 51/16* (2013.01); *H04L 51/32* (2013.01); *H04L 67/02* (2013.01); *H04L 67/306* (2013.01)

(58) Field of Classification Search
CPC ......... G06F 17/30867; G06F 17/30864; G06F 17/30424; G06F 17/30038; H04L 65/604; H04L 65/403; G06Q 50/01
USPC ........ 707/728, 723, 737, 758; 715/752, 753; 709/204

See application file for complete search history.

(56) References Cited

U.S. PATENT DOCUMENTS

| | | | | |
|---|---|---|---|---|
| 8,375,024 | B2 * | 2/2013 | Goeldi ................... | G06Q 10/00 707/709 |
| 9,009,162 | B1 * | 4/2015 | Luo ................... | G06F 17/30864 705/319 |
| 2009/0106839 | A1 * | 4/2009 | Cha ........................ | G06F 21/552 726/23 |
| 2010/0205541 | A1 * | 8/2010 | Rapaport ............... | G06Q 10/10 715/753 |
| 2011/0258044 | A1 * | 10/2011 | Kargupta ............... | G06Q 10/08 705/14.49 |

(Continued)

OTHER PUBLICATIONS

George at al., "Confidence Intervals for Signal to Noise Ratio of a Poisson Distribution," American Journal of Biostatistics, 2011, Revised Aug. 28, 2012, pp. 44-55, www.thescipub.com/PDF/amjbsp. 2011.44.55.pdf.

(Continued)

*Primary Examiner* — Frantz Coby
(74) *Attorney, Agent, or Firm* — Shumaker & Sieffert, P.A.

(57) ABSTRACT

A system and method for trend detection in a messaging platform. A trend detection model is selected and a time series having a plurality of instances of social data is received, wherein the instances of social data share a countable parameter. A count is made of occurrences of countable parameters in each instance of social data assigned to that bin and a trend detected based at least in part on the trend detection model and on the count for each bin.

20 Claims, 13 Drawing Sheets

(56) References Cited

U.S. PATENT DOCUMENTS

| | | | | |
|---|---|---|---|---|
| 2012/0016948 | A1* | 1/2012 | Sinha | G06Q 10/10 709/207 |
| 2012/0185472 | A1* | 7/2012 | Ahmed | G06F 17/30867 707/728 |
| 2012/0272160 | A1* | 10/2012 | Spivack | G06Q 10/10 715/752 |
| 2013/0138673 | A1* | 5/2013 | Uemura | G06F 17/30038 707/758 |
| 2013/0151531 | A1* | 6/2013 | Li | G06F 17/30734 707/740 |
| 2013/0298038 | A1* | 11/2013 | Spivack | H04L 65/403 715/753 |
| 2014/0129559 | A1* | 5/2014 | Estes | G06F 17/30424 707/737 |
| 2014/0280571 | A1* | 9/2014 | Tarbox | G06Q 50/01 709/204 |
| 2014/0297745 | A1* | 10/2014 | Tarbox | H04L 65/604 709/204 |
| 2014/0358911 | A1* | 12/2014 | McCarthy | G06F 17/30864 707/723 |
| 2014/0365302 | A1* | 12/2014 | Walker | G06T 11/206 705/14.53 |
| 2015/0112963 | A1* | 4/2015 | Mojtahedi | G06F 17/3087 707/711 |
| 2016/0117063 | A1* | 4/2016 | Fuller | G06F 3/04817 715/739 |
| 2016/0189174 | A1* | 6/2016 | Heath | G06Q 30/0201 705/7.29 |

OTHER PUBLICATIONS

Ihler et al., "Adaptive Event Detection with Time—Varying Poisson Processes," Proceedings of the 12th ACM SIGKDD International Conference on Knowledge Discovery and Data Mining, Aug. 20-23, 2006, 10 pgs., www.datalab.uci.edu/papers/event_detection_kdd06.pdf.

Nikolov, "Trend or no trend: a novel nonparametric method for classifying time series," Master's Thesis, Massachusetts Institute of Technology, Cambridge, MA, Sep. 2012, 68 pgs., http://dspace.mit.edu/bitstream/handle/1721.1/85399/870304955-MIT.pdf.

\* cited by examiner

TREND DETECTION IN A MESSAGING PLATFORM

This application claims the benefit of U.S. Provisional Application No. 62/170,966, filed Jun. 4, 2015, the entire contents of which are incorporated herein by reference.

BACKGROUND

Computing devices, such as smartphones, laptops, and desktop computers, have enabled users to generate, distribute, and consume user-generated social and other media content across a broad range of topics and geographic areas. Information distribution platforms allow users to identify specific topics of interest and share information related to the topics in a real- or near real-time manner. For example, an information distribution platform may allow users to label user-generated content with tags, such as hashtags, that identify or otherwise associate a particular topic with the user-generated content. In this way, information distribution platforms may allow users to search for user-generated content associated with a particular topic based on a hashtag.

SUMMARY

In one example, a method includes selecting, by a computing device, a trend detection model, receiving, by the computing device, a time series having a plurality of instances of social data, wherein the instances of social data share a countable parameter, counting, for each of a number of bins and by the computing device, occurrences of one or more of the countable parameters in each instance of social data assigned to that bin, determining, by the computing device and based at least in part on the trend detection model and on the count for each bin, a measure of a trend associated with the countable parameter, determining, by the computing device, whether the measure of the trend satisfies a trend threshold and, responsive to determining that the measure of the trend satisfies the trend threshold, outputting, by the computing device, at least one indication of the detected trend.

In another example, a computing device includes at least one processor and at least one non-transitory computer-readable storage medium storing instructions that are executable by the at least one processor to select a trend detection model, receive a time series having a plurality of instances of social data, wherein the instances of social data share a countable parameter, for each of a number of bins, count occurrences of one or more of the countable parameters in each instance of social data assigned to that bin, determine, based at least in part on the trend detection model and on the count for each bin, a measure of a trend associated with the countable parameter, determine whether the measure of the trend satisfies a trend threshold and, responsive to determining that the measure of the trend satisfies the trend threshold, output at least one indication of the detected trend.

In yet another example, a non-transitory computer-readable storage medium is encoded with instructions that, when executed, cause at least one processor of a computing device to select a trend detection model, receive a time series having a plurality of instances of social data, wherein the instances of social data share a countable parameter, for each of a number of bins, count occurrences of one or more of the countable parameters in each instance of social data assigned to that bin, determine, based at least in part on the trend detection model and on the count for each bin, a measure of a trend associated with the countable parameter, determine whether the measure of the trend satisfies a trend threshold, and responsive to determining that the measure of the trend satisfies the trend threshold, output at least one indication of the detected trend.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
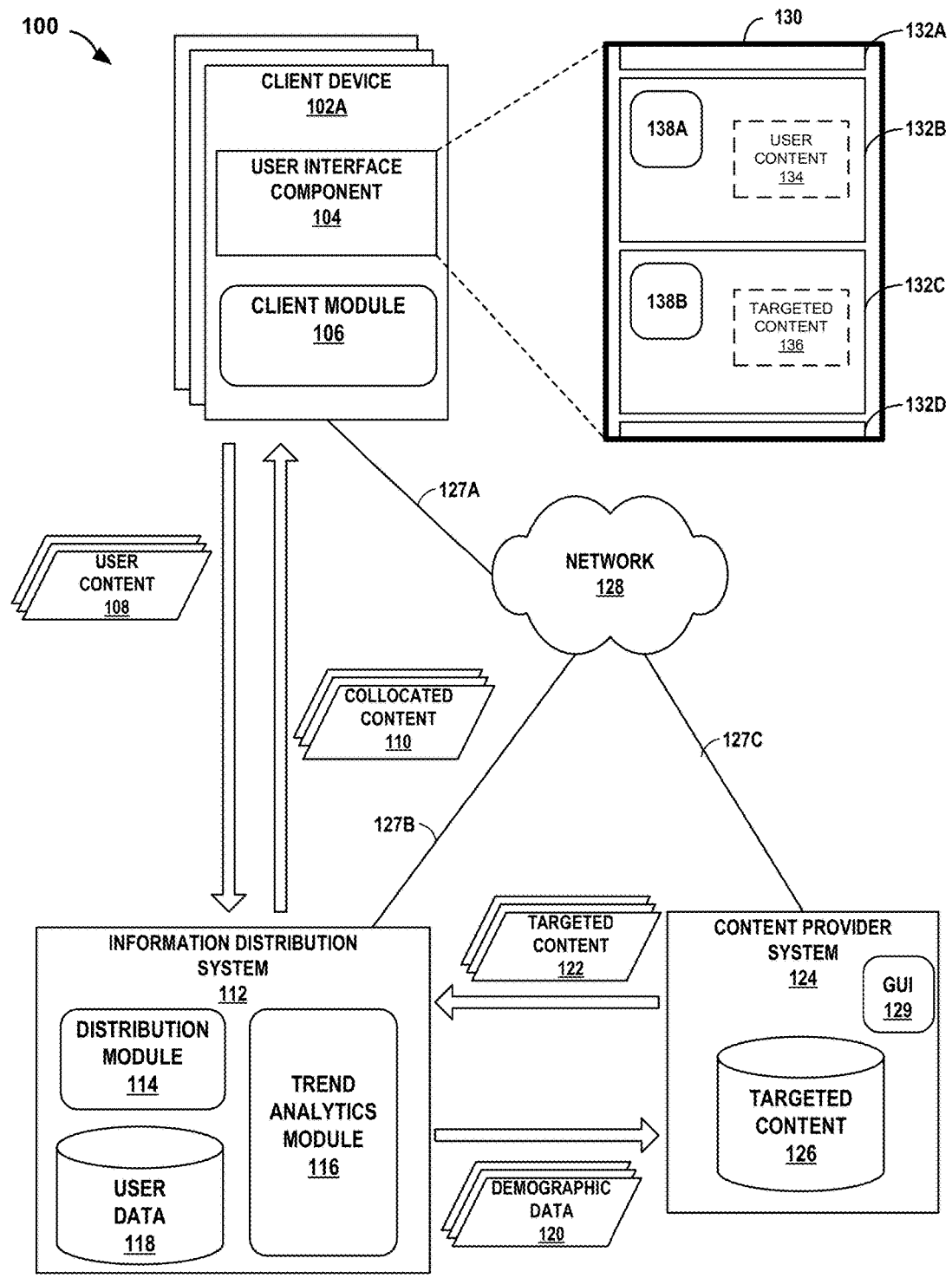
FIG. 1 is a conceptual diagram illustrating an example system that is configured to select candidate advertisements for display on a client device based on a point-wise learning model and a pair-wise learning model, in accordance with one or more aspects of the present disclosure.

Techniques of the disclosure are directed to a process of discovering, measuring, comparing and analyzing changes in time series data that arise from online social interactions. User interactions in social data tell us a great deal about the real world. Often, these insights are not limited to any particular segments of time. By understanding the time-dependent behavior of groups of social media users, computing devices can identify and even predict real-world trends.

Time-dependent user behavior in an online social media platform may be measured using bucketed counts of mentions, hashtags, followers, friends, links, or any other quantity that can be counted over time. If that quantity is defined by the presence of a word or phrase, that word or phrase is called the topic. Once measured, the change in counts over time across topics or other bucketed measures provides important insight into a variety of areas of social interaction. For instance, a rise or fall in counts associated with particular topics might herald social or political trends, might indicate consumer satisfaction or dissatisfaction with a product, or might be no more than cyclical movements in response, for example, to holidays or the change of seasons.

When analyzing changes in a social data time series, therefore, the kinds of changes that are interesting may vary, for instance, by topic, by the type of parameter bucketed, and by the time period being analyzed. For example, growth over time of an audience is a simple but important measure of change. Similarly, the data time series may be influenced by the growth in traffic or by seasonal cycles of change, such as, for example, how June compares to December. Against the backdrop of factors such as steady growth and cyclic variations, it can be difficult to detect emerging changes, in which a count or an incremental count rises from something negligible or unimportant to something significant. And it can be difficult to detect structural changes, where a time series abruptly shifts from one state to another.

Various sorts of real-world activities, events, and trends might be reflected in social data. In addition, various properties of those events might be relevant to an analyst. Suppose that an influential financial analyst tweets a strong opinion about a particular stock and that tweet goes viral. Or, suppose a large number of customers use a social media platform to complain about a brand new product. In both cases, good first questions are: when did the event happen, or when did the trend start. As a follow-up, one could ask questions regarding the significance of the change and the size of the increase or decrease. More importantly, a question may arise as to how large the change is relative to typical changes on the social media platform. The quantification not only allows an analyst to distinguish the atypical from the typical, but it also allows them to compare one atypical event to another.

In addition, questions may arise as to whether there are characteristics of atypical events that allow them to be separated into groups that can then be assigned real-world meaning (e.g. seasonal trends, holiday events). If so, the assignments may point toward a particular choice of quantitative model for the event. In addition, if the identification of an atypical period of time can be quantified, in some cases it can be used to automate trend detection or to predict future behavior.

Identifying growth, cycles, and—especially—emerging and structural changes, is often difficult. One reason is the fact that often it is difficult to know in advance the scale or size of the change. The time interval over which a change occurs can range from fractions of seconds to years, a difference of ten orders of magnitude. In addition, the size of the change can range from counts of tens through counts of billions. A meaningful change might be hidden in the sheer volume of traffic related to a particular topic. Furthermore, the community of users generating or associated with the change can range from a single person through a group of 100 million people. It can often be difficult to construct algorithms that function evenly over such broad ranges of data.

Finally, changes happen all the time and an analyst may want to identify single, rather than composite, changes. The corpus of social data is enormous, and size alone brings about other difficulties. Most signals of interest are relatively small. Data that match a particular topical filter are usually contaminated by other signals, and changes in the data reflect the cumulative result of all underlying effects. The size of the data also implies the existence of many atypical patterns that are entirely due to statistical variation, rather than reflecting real-world events. Despite this knowledge, humans prefer to associate any changes with meaningful and nameable events. Even the distinction between the real world and the online social interactions is complicated, and it can be difficult to establish causality. It can be difficult to determine when or if the social data reflects the offline world, or the extent to which online social interactions impact the rest of the world? The first step in unravelling this tangled feedback network may be to quantify the social data trends.

Attempts, however, to quantify changes in social data are subject to trade-offs. At times, random fluctuations in the data will be identified as a trend. At other times, real trends will not be identified. In practice, and in certain cases, there may be, e.g., three particular measures of performance that account for these types of mistakes. First is the time-to-detection, or the time between the real-world event and the detection in the social data. Second is the precision, or the fraction of identified trends that are not statistical flukes. Last is the recall, or the fraction of real trends that are identified by the trend detection scheme. These performance metrics cannot be optimized without impacting the other performance metrics. For example, if the goal is to quickly identify an emerging change with high confidence that the computing device is not detecting random fluctuations, the resulting trend model will necessarily have low recall for real trends, and be able to only identify very statistically significant patterns.

FIG. 1 is a conceptual diagram illustrating a system 100 for detecting trends in streams of social media data, in accordance with one or more aspects of the present disclosure. System 100 includes one or more client devices 102, an information distribution system 112, a content provider system 124, and a network 128.

Network 128 represents any communication network (e.g., public, private, commercial, governmental, or residential) that communicatively links two or more computing devices or systems for the transmission of information. For example, network 128 may be a wireless and/or wired network for transmitting data between two or more computing devices located at two or more different physical locations. In some examples, network 128 may represent or include the Internet. Client devices 102 (including, for example, client device 102A), information distribution system 112, and content provider system 124 may send and receive data via network 128 using various suitable communication techniques. For instance, data may be transmitted between the devices using communication links 127A-127C, which may be wired and/or wireless. Network 128 may include any required hardware for communicatively linking client device 102A, information distribution system 112, and content provider system 124. For example, network 128 may include various switches, hubs, routers, and other network equipment that provides for the exchange of information between the devices.

Client devices 102 represent any type of personal computing device from which a person can view, listen to, feel, or otherwise obtain output based on information received via a network, such as network 128. For example, client device 102A may be a laptop computer, a mobile telephone, phones, a tablet computers, a set-top box, a desktop computer, a server, a mainframe, a wearable device (e.g., a watch, computerized glasses, and the like), a personal digital assistant (PDA), a gaming system, a media player, an e-book reader, a television platform, a digital media player, an automobile navigation and/or entertainment system, or any other type of mobile and/or non-mobile computing device that is configured to communicate (e.g., transmit and receive data) across a network and output information received via the network to a user.

Client devices 102 include a user interface component 104. User interface component 104 may include various technologies for receiving input from, and/or outputting information to, a user of client device 102. For example, user interface component 104 may include a microphone, a touch screen or other type of presence-sensitive screen, and other types of sensors and input devices for receiving input from a user. User interface component 104 may also include a display (e.g., liquid crystal (LCD), light emitting diode (LED), organic light-emitting diode (OLED), or any other type of display), a speaker, a haptic feedback device, or any other type of output device for outputting visible, audible, and/or haptic feedback type information to a user of client device 104. Although illustrated as a presence-sensitive display integrated with client device 102, in some examples, user interface component 104 may be a display device, such as a monitor integrated in a laptop computer, or a standalone monitor coupled to a desktop computing device, to name only a few examples.

User interface component 104 may provide a user interface from which a user may interact with a client device 102 (such as client device 102A) to cause client device 102 to perform one or more operations. For example, user interface component 104 may give a user access to a service, provided by information distribution system 112, for receiving content (e.g., social media, news, television, streaming audio, streaming video, or other types of content) distributed across network 128. As further described in this disclosure, information distribution system 112 may, for instance, provide content via network 128 to client device 102A. Client device 102A may process and output the content as one or more graphical images, sounds, and haptic-feedback sensations, at user interface component 104 of client device 102A.

Client devices 102 may also include a client module 106. Client module 106 may send information generated by a user to and receive information from an information network provided by information distribution system 112. For instance, a user may have a user account stored at information distribution system 112. The user account may include a unique identifier (e.g., a username) for the user, authentication credentials, and personal information (e.g., name, phone number, email address, home address, to name only a few examples). Client module 106 may authenticate with information distribution system 112 based on authentication credentials provided by the user to client device 102.

In some examples, client module 106 provides a graphical user interface (GUI) that enables a user to generate or otherwise compose user content 108 that client module 102 sends to information distribution system 112. Such user content may include text, images, video, and/or audio information. In some examples, a user may compose a message that includes various content. In addition to content, a message may include one or more hashtags and/or mention tags. In some examples, a hashtag may represent or otherwise identify a particular topic associated with the content of a message. As such, a user composing a message on a particular topic may associate a hashtag for the topic with the message. A mention tag may represent or otherwise identify a particular user that has a corresponding user account at information distribution system 112. A user composing a message who wishes to refer to or address another particular user may associate a mention tag for the particular user with the message. When a user generates user content 108, client module 106 may send user content 108 to information distribution system 112, which may process and/or distribute the user content as further described in this disclosure.

In some such examples, client module 106 enables the user to perform one or more functions associated with user content. For instance, client module 106 may enable a user to "share," "re-share," "read," and "follow" content as well as "follow" and "mention" other users. In some examples, "sharing" a message or content may refer to composing an original message or original content that is subsequently distributed by information distribution system 112 to other users. In some examples, "re-sharing" a message or content may refer to an operation initiated by a user to re-post a message or content that was originally generated by another user. In some examples, "reading" a message or content may refer to an activity of a user to view the message or content. In some examples, "following" may refer to an operation initiated by a user to subscribe to messages and/or user content of another user. As such, a user that follows a particular user may receive updates of messages and/or user content generated by the particular user. In some examples, "mentioning" a particular user may refer to an operation initiated by a user to identify or otherwise associate the particular user with a message or user content.

Client module 106 may perform operations described herein using software, hardware, firmware, or a mixture of both hardware, software, and firmware residing in and executing by client device 102 or at one or more other remote computing devices. As such, client module 106 may be implemented as hardware, software, and/or a combination of hardware and software. Client device 102 may execute client module 106 as or within a virtual machine executing on underlying hardware. Furthermore, client module 106 may be implemented in various ways. For example, client module 106 may be implemented as a downloadable or pre-installed application or "app." In another example, client module 106 may be implemented as part of an operating system of client device 102.

As shown in FIG. 1, system 100 includes information distribution system 112. In one example approach, information distribution system 112 implement techniques of this disclosure to detect trends in streams of social media data. In one such example approach, information distribution system 112 is implemented as one or more computing devices, including but not limited to one or more desktop computers, laptop computers, mainframes, servers, cloud computing systems, and the like.

In one example approach, information distribution system 112 includes data and one or more modules that, when executed, perform one or more operations. For example purposes, information distribution system 112 includes distribution module 114, trend analytics module 116 and user data repository 118. Information distribution system 112 may, however, include more or fewer modules or data in other examples.

In the example of FIG. 1, user data repository 118 includes user data such as, for example, data representing user accounts and demographic data about each user. In one example approach, a user account for a user of information distribution system 112 may include is not limited to: a user name, password, phone number, email address, and home address. In some examples, the user data may also include, current location of the user, devices authenticated with the user, interests of the user, history of content generated by the user, history of content read and/or followed by a user, hashtags and/or mention tags used by the user, other users followed by the user, other users following the user, private messages sent and/or received by the user, and/or search history of the user, to name only a few examples.

Demographic data may include personally sensitive and/or personally identifiable information about users of information distribution system 112, which may be referred to as "sensitive data." In some instances, information distribution system 112 only shares demographic data of a user if the user expressly "opts-in" or provides an explicit indication of user input that authorizes information distribution system 112 to share such sensitive data with third parties, such as content providers or other entities. In some examples, information distribution system 112 provides the user with full disclosure and requires full consent of the user before collecting and/or sharing any demographic and/or sensitive data. In some examples, a particular jurisdiction may have specific privacy requirements with respect to demographic data. Information distribution system 112, in such examples, may implement controls that prevent or restrict the sharing of demographic data in order to comply with privacy requirements of a particular jurisdiction.

Information distribution system 112 may also include distribution module 114. Distribution module 114 may construct and maintain information generated by users and/or operators of information distribution system 112. Distribution module 114 may receive user content 108 from one or client devices, and store and organize the user content in the information network. The user content may be stored and organized using any number of data stores and data structures, such as but not limited to graphs, lists, tables, a Relational Database Management System (RDBMS), Object Database Management System (ODBMS), and/or Online Analytical Processing (OLAP) system.

In some examples, distribution module 114 may send targeted content 136 to client devices for display. Targeted content may include, but is not limited to, advertisements, offers, rewards, discounts, political information, public interest information, entertainment information, sports information, or other informational content. As shown in FIG. 1, distribution module 114 may send collocated content 110 that includes targeted content and/or distributed user content from other users. In one example approach, client module 106 generates a graphical user interface 130 for display that includes information included in collocated content 110, such as user content 134 and targeted content 136 (such as, for example, an advertisement). In some examples, user interface 130 outputs information in a sequence or stream of "cards" or graphical user elements 132 (such as elements 132A-132D of FIG. 1). The sequence or stream of "cards" may be ordered in chronological or reverse chronological order, in some examples. As shown in FIG. 1, card 132B includes an icon 138A and user content 134. Card 132C includes an icon 138B and targeted content 136. Icon 138A may correspond to the particular user that shared or re-shared user content 134. Icon 138B may correspond to the particular content provider that provided targeted content 136.

As shown in FIG. 1, targeted content 136 may be interspersed with other user content in graphical user interface 130. Accordingly, if a user is viewing a sequence or stream of cards, such as cards 132, information distribution system 112 may also include one or more cards with targeted content. As an example, if the sequence or stream of cards is associated with a specific topic, targeted content that is relevant to the specific topic may be included in the sequence or stream of cards.

In some examples, information distribution system 112 may receive targeted content from content providers operating one or more content provider systems, such as targeted content 122 from content provider system 124. Content providers may include advertising agencies, companies, public interest organizations, governments, individual persons, and political candidates, to name only a few examples. Such content providers may be interested in providing target content to users of information distribution system 112. More particularly, content providers may be interested in generating and displaying targeted content to specific audiences (e.g., sets of users of information distribution system 112) that are highly engaged or interested in a particular event, controversy, person, or topic.

Content provider system 124 may send, submit or otherwise provide targeted content 122, selected or generated by the content provider, to information distribution system 112. In some examples, content provider system 124 may also provide a bid or price to information distribution system 122 that indicates an amount of money that the content provider will pay to place the targeted content on the display 130 of a particular user or type of user.

In accordance with techniques of this disclosure, trend analytics module 116 may identify trends in user generated content 108, based on one or more sets of metrics, and provide users, analysts and content providers with trend information associated with particular trends. The content providers may use trend information, for example, to generate targeted content 122 for the demographic associated with the trend, to analyze the effect of a marketing campaign or to spot short term, long term or cyclical trends in an audience. By identifying a trend and providing advanced notice of the trend, as well as the demographic data for the audience of the trend, content providers may be able to generate more relevant and timely targeted content for distribution to users of information distribution system 112. As a result, if content providers bid or otherwise compete to distribute targeted content to users of information distribution system 112, the content providers may have greater confidence and, as a result, pay more to distribute the content.

In operation, and as shown in FIG. 1, information distribution system 112 may receive, from a group of client devices 102, a stream of messages composed by users of the client devices. As described above, the messages may include user content 108 as well as hashtags and/or mention tags. Trend analytics module 116 may parse or otherwise analyze the content of the messages to generate one or more metrics. In some examples, trend analytics module 116 monitors and processes the stream of messages in real-time. In other examples trend analytics module 116 may process a batch of messages at scheduled times or in response to an asynchronous event (e.g., a user input or the satisfaction of a quantity threshold for a given number of messages). In some example approaches, trend analytics module 116 uses the one or more metrics to generate a trending score that represents a magnitude of a trend associated with a particular stream of data. For instance, a trending score may be generated for a stream of data associated with a given hashtag, a given topic, a given user or a given demographic. In this way, information distribution system 112 can notify content providers and analysts of trends and, in some cases, send demographic information associated with the trend.

Trend analytics module 116 may determine, using a set of metrics that are based at least in part on the received messages, a trending score that represents a magnitude of a trend for a particular hashtag. To generate the set of metrics, trend analytics module 116 may identify message that include or are associated with a particular hashtag. For instance, trend analytics module 116 may identify each message in the stream of messages with the hashtag #Olympics. Trend analytics module 116 may parse the content of each message associated with the particular hashtag to compute the set of metrics.

Trend analytics module 116 may use any number of metrics to determine a magnitude of a trend for a particular hashtag. An example metric may include an amount (or count) of messages with the particular hashtag that are shared or re-shared per unit of time, which may also be referred to as a velocity for the particular hashtag. The velocity for a particular hash tag may be an amount of messages with the particular hashtag that are shared or re-shared per second, per minute, per hour, or per day, to name only a few examples. In some examples, velocity for a particular hash tag may be the amount of messages with the particular hashtag that are shared. Velocity for a particular hash tag may be the amount of messages with the particular hashtag that are re-shared. In some examples, larger velocities may indicate higher magnitudes of trends, while lower velocities may indicate lower magnitudes of trends.

In some examples, trend analytics module 116 may include a parameter that may be set by an operator that indicates a time duration over which the velocity for a particular hash tag is computed. For instance, trend analytics module 116 may compute the velocity for a particular hash tag based on a time duration starting from a current point in time and extending one hour into the past. More generally, for each metric, trend analytics module 116 may include a parameter that may be set by an operator that indicates a time duration over which the metric is computed. For instance, trend analytics module 116 may compute one or more of the metrics based on a time duration starting from a current point in time and extending one hour into the past.

Another example metric may include a rate of change in the amount of messages with the particular hashtag that are shared or re-shared per unit of time, which may also be referred to as an acceleration for the particular hashtag. For instance, analytics module 116 may compute a rate of change of the velocity for the particular hashtag. The acceleration for the particular hashtag may indicate rate at which the particular hashtag is trending. Accordingly, a larger acceleration for the particular hashtag may indicate more rapid growth for the particular hashtag and potentially a larger trend for the hashtag, while lower accelerations may indicate lower magnitudes of trends. In some examples, the acceleration may be referred to as a "second derivative of virility" or "viral acceleration." The acceleration may indicate a growing trend before the trend becomes much larger.

In some examples, trend analytics module 116 may determine a metric that indicates a total number of users that have shared or re-shared a message that includes the hashtag. Trend analytics module 116 may determine the total number of users that have shared or re-shared the message over a particular duration of time. Trend analytics module 116 may determine a metric that indicates a total number of followers of users that have shared or re-shared a message that includes the hashtag. In some examples, a total number of users that are following other users that have shared or re-shared a message that includes the hashtag may be referred to as a "nodality" metric. As another metric, trend analytics module 116 may determine a total number of active followers of users that have total number of users that have shared or re-shared a message that includes the hashtag. An active follower may be a follower that has recently interacted with information distribution system 112 within a particular time duration. For instance, an active follower may have interacted with distribution system 112 within a time duration starting from a current point in time and extending one day into the past. In some examples, larger amounts of followers or active followers may indicate higher magnitudes of trends, while fewer amounts of followers or active followers may indicate lower magnitudes of trends.

Trend analytics module 116 may determine a metric that indicates the dispersion of users within a social graph, who are sharing and re-sharing messages that include the hashtag. For instance, trend analytics module 116 may generate a social graph, where each node indicates a user. Each edge between two nodes represents a relationship between the two users of the respective nodes. For instance, an edge between two nodes may indicate that one user is a follower of another user. In another example, an edge may indicate that one user has mentioned another user in a message. In any case, trend analytics module may determine a distance or number of edges between one user that shared and or re-shared a message that include the hashtag and another user who also shared and or re-shared a message that include the hashtag. Larger distances may indicate greater dispersion of the hashtag. Accordingly, a metric that indicates larger dispersion of the users, who are sharing and re-sharing messages that include the hashtag, may indicate a greater magnitude of a trend for the hashtag. A metric that indicates smaller dispersion of the users, who are sharing and re-sharing messages that include the hashtag, may indicate a smaller magnitude of a trend for the hashtag.

In one example approach, trend analytics module 116 defines a background model for each trend and looks for deviations from the background model. The background model can be thought to represent the null hypothesis, or the case of no trend. Deviations from the background model are described by a figure-of-merit called η, and large values of η can be said to disprove the null hypothesis.

In another example approach, trend analytics module 116 includes a model for each parameter to be tracked; the model includes both a background component and a trend component. In such an approach, the value η quantifies the extent to which the data looks more like a trend than a non-trend. In one example approach, a topic or other parameter is treated as trending during the time η exceeds a pre-determined value.

In one example approach, to calculate η, one may choose model parameter values. If trend analytics module 116 has access to historical data that is labeled with truth (trend or no-trend) and the true trend start time, module 116 can measure the performance of a choice of model and parameter values, in terms of the precision, the recall, and time-to-detection.

Representative data models will be discussed below. One representative data model is the Poisson distribution. The Poisson distribution describes the probability of observing a particular count of some quantity, when many sources have individually low probabilities of contributing to the count. This distribution model is applicable to the case of counting in social data, because each individual has a small chance of tweeting about a given topic, but the large Twitter user base can lead to significant counts. Trend analytics module 116 can perform a simple form of trend detection by assuming that the counts in a social data time series are Poisson-distributed around some average value, and then looking for unlikely counts according to the Poisson model. Consider, for example, the number of Tweets in some time interval that contain the hashtag phrase "#scotus" (referencing the Supreme Court of the United States).

If one ignores variations in the overall rate of tweeting, one might expect the counts of tweets with the hashtag "#scotus" to vary, but the distributions of counts will generally follow the Poisson distribution, $$P(c_i; v) = v^{c_i} \cdot e^{-v}/c_i! \quad (1)$$

where P is the probability of observing $c_i$ "#scotus" tweets in the given time window, when the expected number of such tweets is v. While one may have little to no way of knowing the true value of v, a good source for this information is the time interval previous to the one being tested, $c_{i-1}$. One may identify trends by counts $c_i$ that are particularly unlikely, given the previous count, $c_{i-1}$, and the assumption of Poisson distributed data.

In this Poisson model, the unlikeliness of a particular count $c_i$ can be quantified by the distance from the mean (v) in multiples of the confidence interval (CI) with confidence level α. Some example confidence intervals for a Poisson mean v and confidence level α can be found in F. George B. Golam Kibria, *Confidence Intervals for Signal to Noise Ratio of a Poisson Distribution*, American Journal of Biostatistics, 2011, pages 44-55, www.thescipub.com/PDF/amjbsp.2011.44.55.pdf.

The parameter η describes the unlikeliness of a particular point:

$$c_i = \eta \cdot CI(\alpha, v) + v, \text{ where } v = c_{i-1}. \quad (2)$$

In other words, a count $c_i$ is defined to reject the null hypothesis when $$c_i \geq \eta_c \cdot CI(\alpha, c_{i-1}) + c_{i-1}. \quad (3)$$

for predetermined values of $\eta_c$ and α. Together, these two parameters control the performance of the algorithm.

Figure 2:
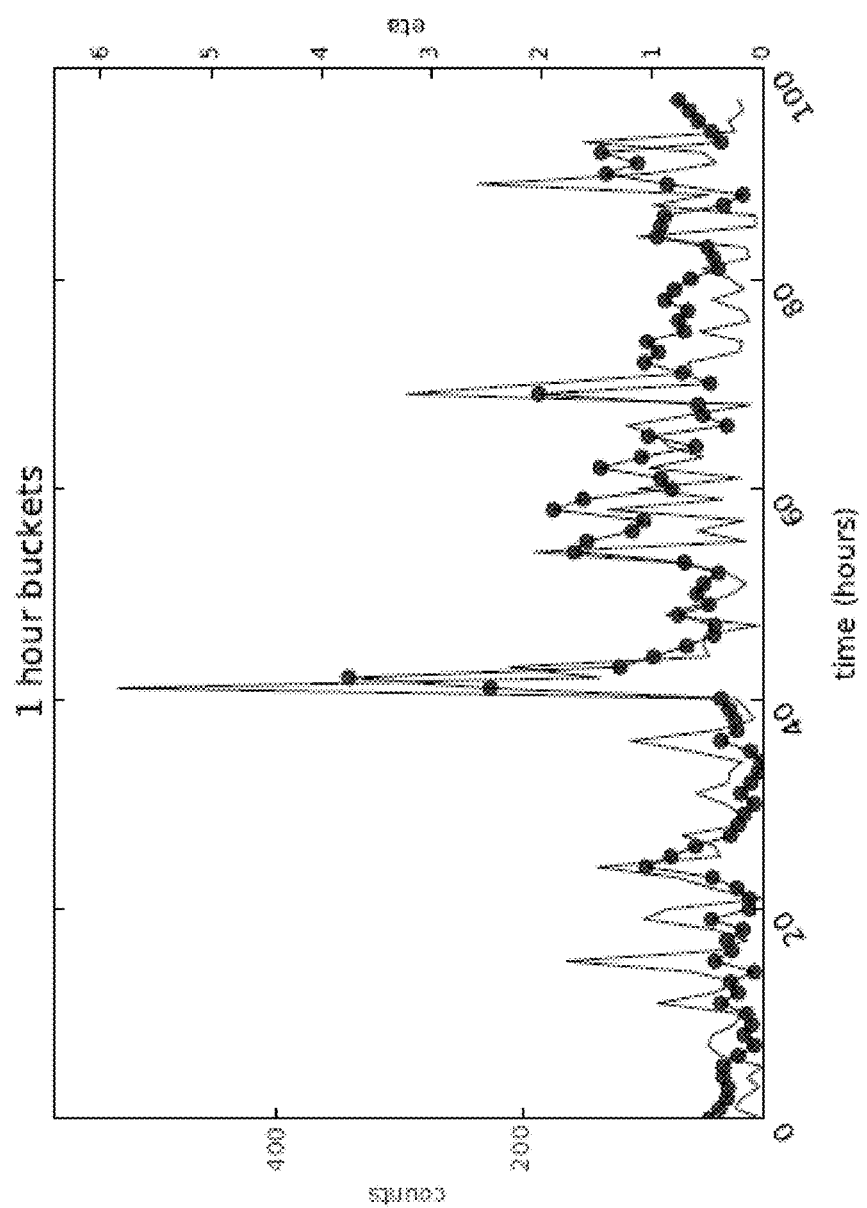
FIG. 2 is a graph of the occurrences of the hashtag "#scotus" per hour, in accordance with one or more aspects of the present disclosure. The time series data are shown in the dots connected by lines. For each point, the parameter $\eta$ is calculated based on the previous point, and plotted as a separate plot. In this case, $\alpha=0:99$.

FIG. 2 is a graph of the occurrences of the hashtag "#scotus" per hour. The time series data are shown in the dots connected by lines as hourly counts for a data set defined by the "#scotus" hashtag. For each point, parameter η is calculated based on the previous point, and plotted. In this case, α=0:99. While there may be minor events driving mentions of "#scotus", this time series does not contain any major real-world events, and the values of η are relatively low.

The point-by-point Poisson model is an attempt to simplify the problem of background description by assuming a very simple model. Yet this simplicity can be a source of challenges. First, the data generally is not Poisson-distributed around the previous data point. For example, given a choice of α=0.99, one would expect to see values of η>1 only about 1% of the time. Nevertheless, the parameter η is indicative of atypical counts, just not with the usual probability interpretation.

Figure 3:
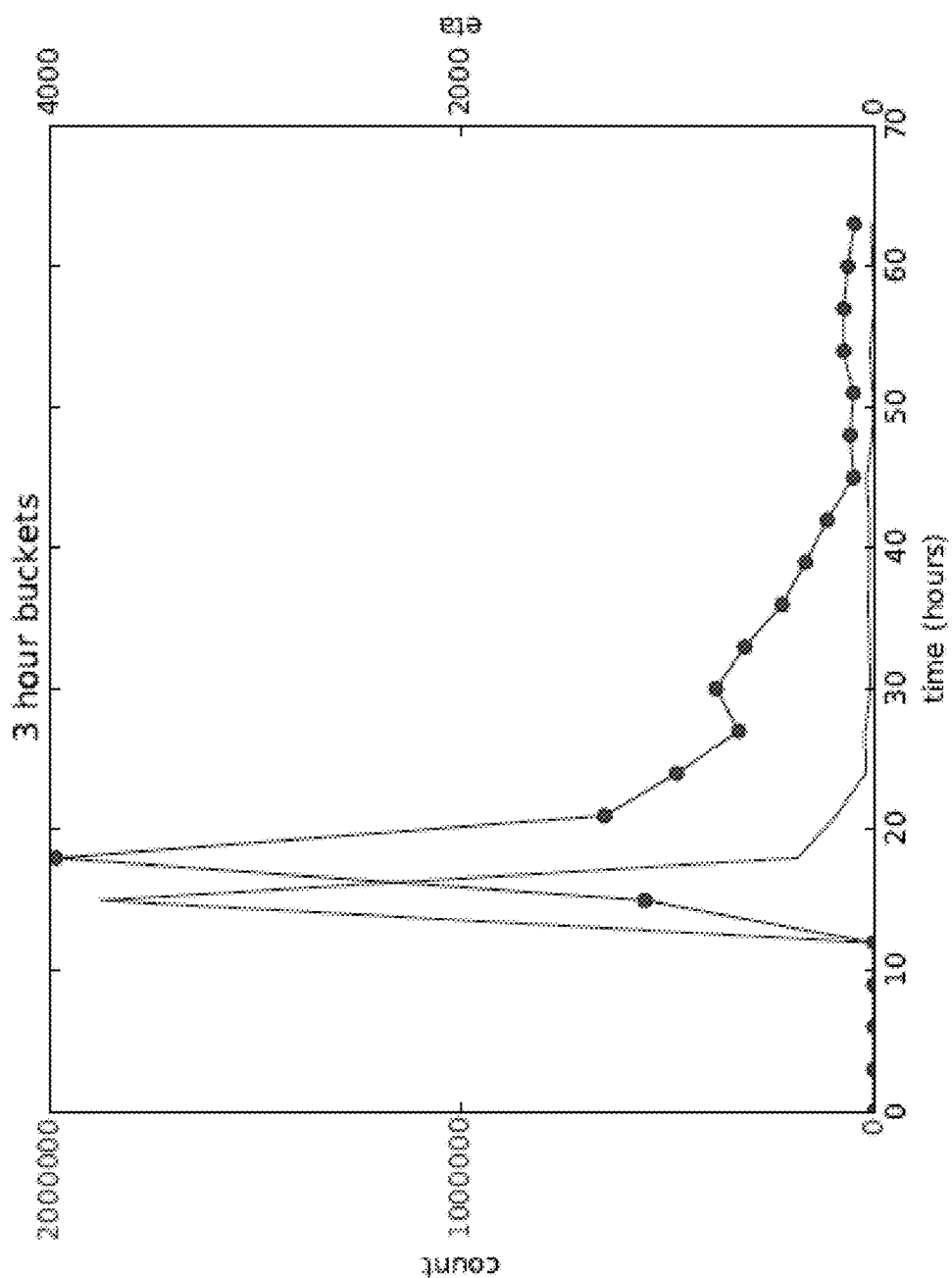
FIG. 3 is a graph of the mentions per 3-hour intervals of a famous person at around the time of his death. The time series data are shown in the black dots connected by lines. For each point, the parameter $\eta$ is calculated based on the previous point, and plotted as a separate plot. In this case, $\alpha=0:99$.

For example, FIG. 3 is a graph of the mentions per 3-hour intervals of a famous person at around the time of his death. The time series data are shown in the black dots connected by lines. For each point, the parameter η is calculated based on the previous point, and plotted as a separate plot. In this case, α=0:99. In the example of FIG. 3 the time series shows with a very distinctive, large spike around the time of the event, and the corresponding values of η are very large.

Once a value of α is chosen, the definition and identification of a trend is still dependent on the choice of two parameters values: $\eta_c$ and the time interval for a single data point. As $\eta_c$ is increased, the precision is increased, but more real trends are missed (decreased recall). A similar trade-off exists for the bin width, as shown in FIG. 4.

Figure 4:
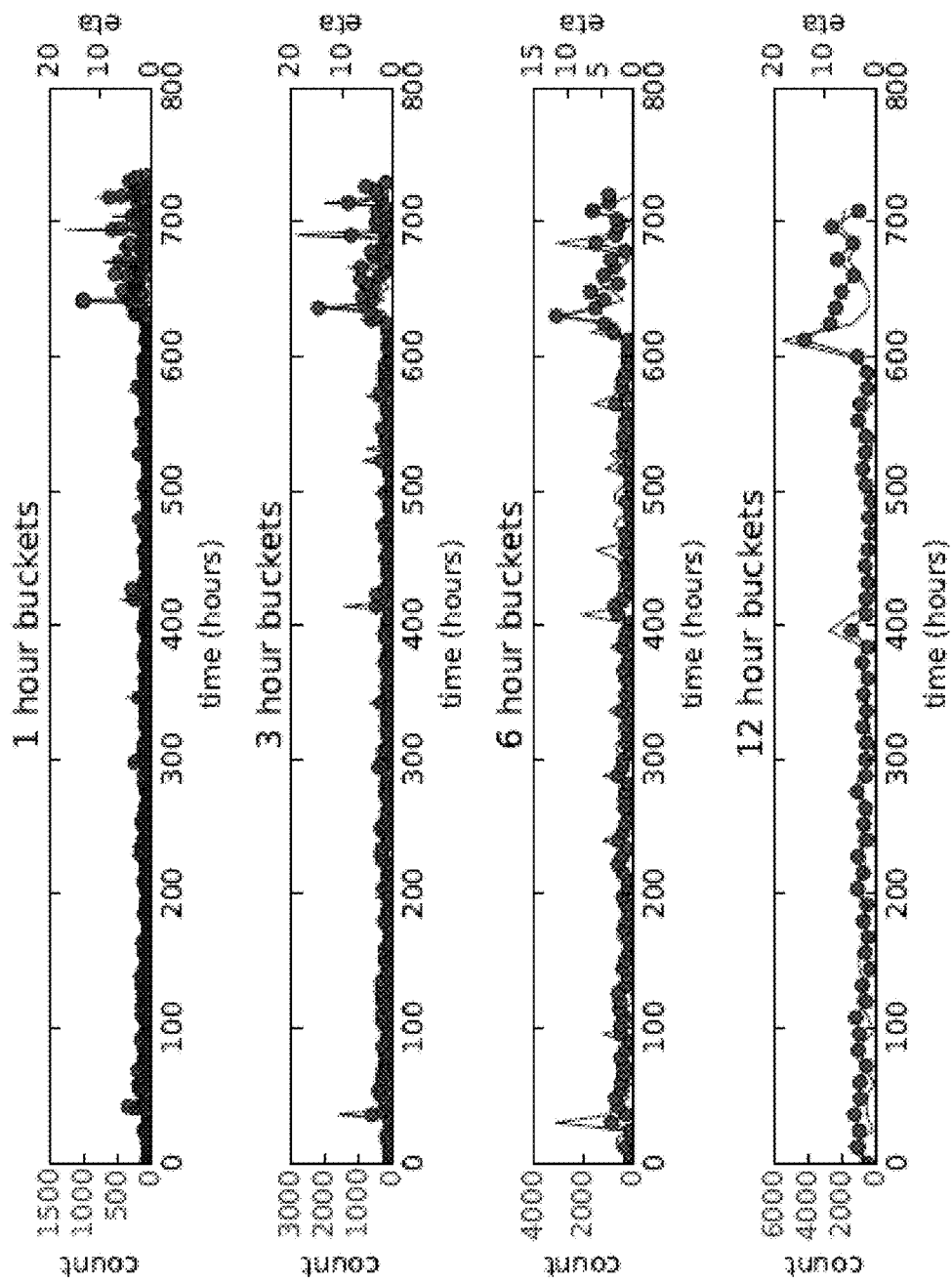
FIG. 4 is a graph of the occurrences of the hashtag "#scotus" across various sized time bins, in accordance with one or more aspects of the present disclosure. The time series data are shown in the dots connected by lines. For each point, the parameter $\eta$ is calculated based on the previous point, and plotted as a separate plot. In this case, $\alpha=0:99$.

FIG. 4 is a graph of the occurrences of the hashtag "#scotus" across various sized time bins. The time series data are shown in the dots connected by lines. For each point, the parameter η is calculated based on the previous point, and plotted as a separate plot. In this case, α=0:99. As can be seen, small bins provide faster identification of trends, but lead to worse precision.

Despite the challenge of choosing appropriate parameter values, the point-by-point Poisson model can be very appealing. It's fast, in part because it requires a single data point for the background model. It's also easy to implement, and its single measure of atypicality, η, is fairly easy to interpret.

Another representative data model is the cycle-corrected Poisson model. Most social data time series exhibit cyclic patterns that reflect genuine human cycles of activity. For example, if the majority of users that generate a particular body of Tweets live in a narrow band of time zones, one would naturally expect to see fewer Tweets during night hours for those time zones. Thus, the patterns of hours, days, weeks, and even months can be reflected in changes in rates of social media use.

To reduce the rate of false trend identification due to expected, cyclic human activity, the cycle-corrected Poisson model builds on the foundation of the point-by-point Poisson model, and uses a background model derived from data similar to the point being tested. For example, if a data point represents 3 hours of data from a Friday night in the Eastern US, it would not make a good model to use the previous three hours as the Poisson mean. People Tweet about different topics at 2-5 PM than they do at 5-8 PM, leading to topical time series with large variations simply due to the progression of the day. A better background model for the data from 5-8 PM on a particular Friday is an average over the data from the 5-8 PM interval on other days of the week. An analyst can build an even better model by taking the average over the same time interval, but only from previous Fridays. If monthly cycles of activity are important, one might even build a background estimate from only Fridays around the same time of the month.

One potential drawback of this technique, relative to the point-by-point model, is the need to sample and retain enough data to calculate the background estimates. If anomalous events have previously occurred in the time series, this will contribute to the rolling averages and artificially increase the rate of false positives.

Figure 5:
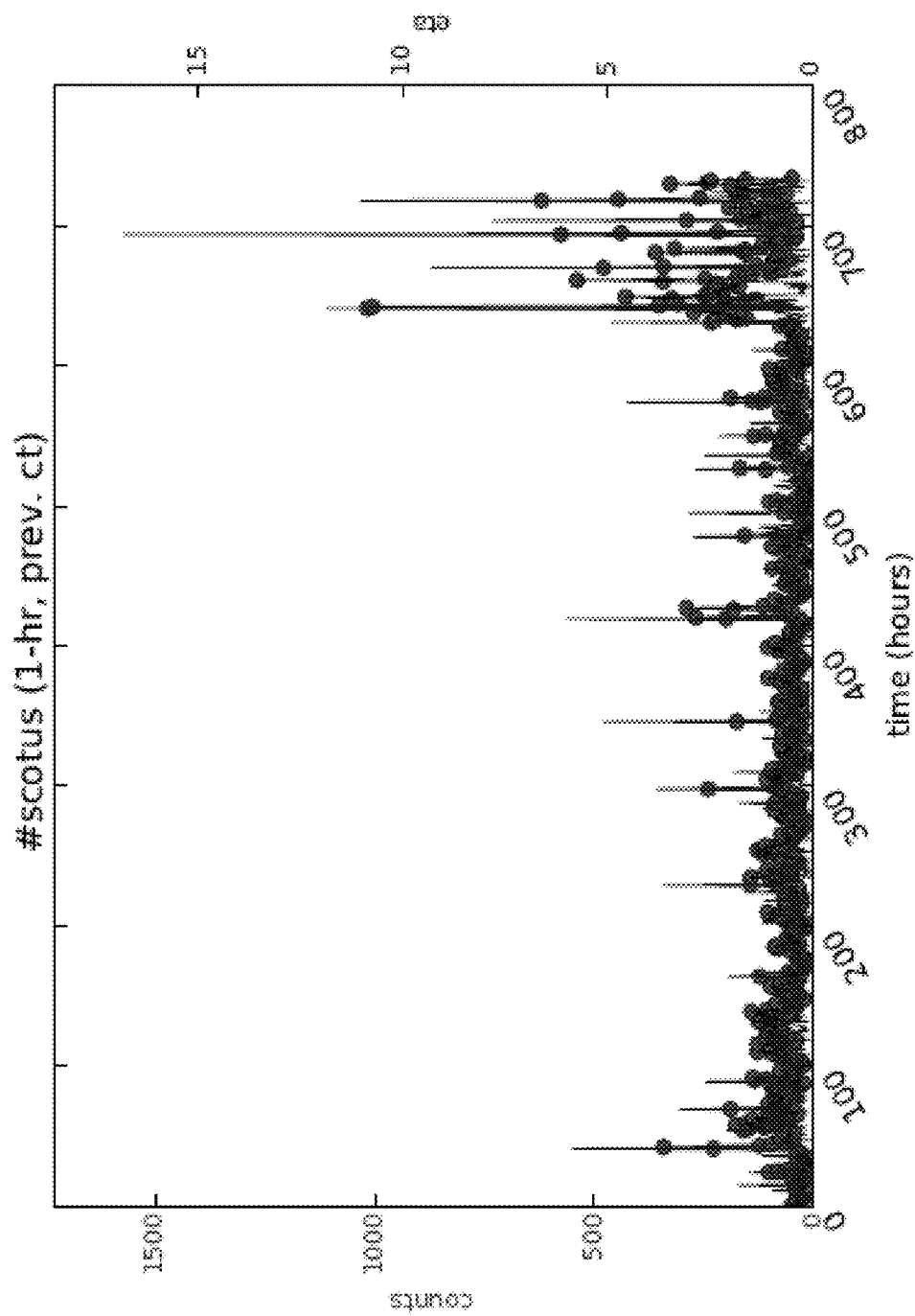
FIG. 5 is a graph of the occurrences of the "#scotus" mentions per hour, in accordance with one or more aspects of the present disclosure. The time series data are shown in the dots connected by lines. For each point, the parameter $\eta$ is calculated based on the previous point, and plotted as a separate plot. In this case, $\alpha=0:99$.
Figure 6:
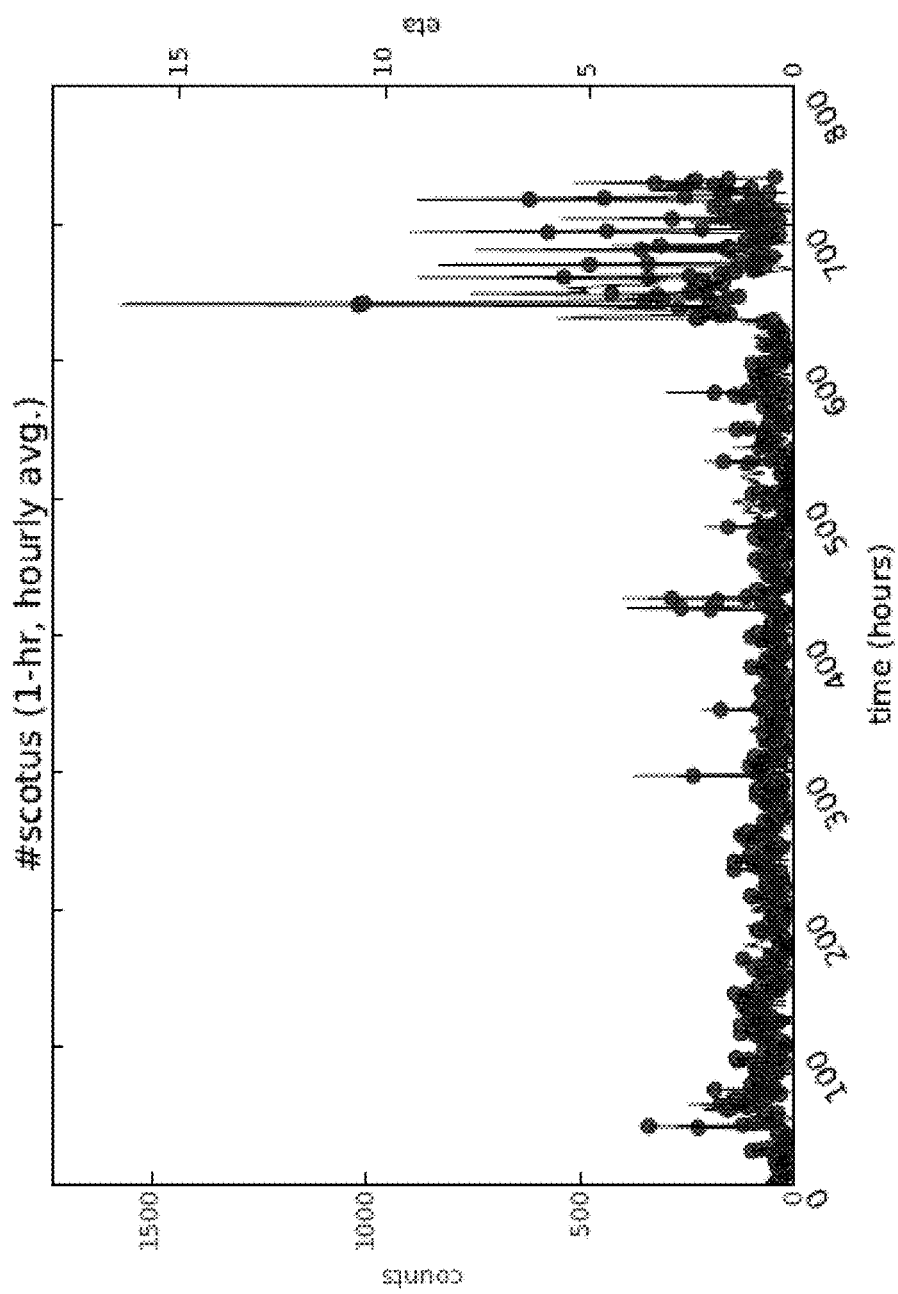
FIG. 6 is another example graph of the occurrences of the "#scotus" mentions per hour, in accordance with one or more aspects of the present disclosure. The time series data are shown in the dots connected by lines. For each point, the parameter $\eta$ is calculated based the average value from the same hour on previous days in the time series, and plotted as a separate plot. In this case, $\alpha=0:99$.

FIGS. 5 and 6 are a comparison of the two Poisson-based background model discussed above. FIG. 5 is a graph of the occurrences of the "#scotus" mentions per hour. The time series data are shown in the dots connected by lines. For each point, the parameter η is calculated based on the previous point, and plotted as a separate plot. In this case, α=0:99. FIG. 6 is also a graph of the occurrences of the "#scotus" mentions per hour. Again, the time series data are shown in the dots connected by lines. For each point, however, in FIG. 6 the parameter η is calculated based the average value from the same hour on previous days in the time series, and plotted as a separate plot. Once again, α=0:99. As can be seen, the cycle-corrected model shows generally reduced η values (fewer false positives), but actually produced a greater η value at the initial spike at around hour 650.

Continuing to expand on the basic Poisson model, there are a variety of further improvements that can be made. Any value chosen for the Poisson mean v can be further stabilized by calculating an average over a rolling window of adjacent data points. If the long-term overall growth rate for the data is known, this baseline can be subtracted from the data. Some example frameworks for removing the effects of previously-occurring anomalies from the Poisson background model are described in Ihler, Hutchins, Smyth, *Adaptive Event Detection with Time Varying Poisson Processes,* 2006, www.datalab.uci.edu/papers/event_detection_kdd06.pdf.

There are two drawbacks to the Poisson models described above. First, it is difficult to choose values for α and $\eta_c$ that are a good choice for trends of all shapes and sizes. Moreover, our decision to use the Poisson distribution as a model for the variations in the data is not necessarily a good choice. In fact, many social data time series are not Poisson-distributed, so these problems can, in some case, be avoided simply by comparing the data to real examples of trending and non-trending data.

One such data-driven method of detecting trends is discussed next. In one example approach, a library of labeled time series is compiled, identifying each series as trending or non-trending. One can then define a weight that is a function of the distance between a labeled time series and the data in question. The final result is given by the ratio of the total weight for the trending time series divided by the total weight for the non-trending time series. An example non-parametric method for detecting trends in data series is described in S. Nikolov, *Trend or No Trend: A Novel Nonparametric Method for Classifying Time Series,* 2011, dspace.mit.edu/bitstream/handle/1721.1/85399/870304955-MIT.pdf.

In one example approach, trend analytics module 116 collects reference time series from historical data. Based on their shape and the details of real-life events associated with them, one can label them + (trending) or − (non-trending).

The sets of references time series are named R+ and R− (and together comprise R). The model has been shown to be effective when the size of R is O(100). In general, the elements of R+ and R− are much longer than the time series with which they are compared.

One can next define a distance between two same-length time series: d(r, s), where r is in R+ or R− and s is the time series that were evaluating for trending behavior. To facilitate comparison, both time series are unit-normalized. In one approach, one can use the Euclidean distance:

$$d(r,s) = \sum_{i=1}^{N} (r(i) - s(i))^2 \qquad (4)$$

where r(i) and s(i) are the i-th points in the N-length time series r and s. Other choices of distance functions emphasize different properties of the time series, and lead to different value of the trend detection metrics discussed below. If r is longer than s, one can define the distance to be the smallest of all distances d($r_s$, s), where $r_s$ is any s-length sub-series of r. Given a distance function, one can then define a weight in terms of a scaling parameter λ.

$$W(r,s) = e^{-\lambda * d(r,s)} \qquad (5)$$

The parameter λ controls the relative importance of very similar vs. very different reference series. For example, a large value of λ generates very small weights for elements of R very different from s.

Trend analytics module 116 then sums up the weights from the trending and non-trending comparisons and produce a final metric from their ratio:

$$\eta(s) = (\Sigma_{r \in R+} W(r,s)) / (\Sigma_{r \in R+} W(r,s)) \qquad (6)$$

Figure 7:
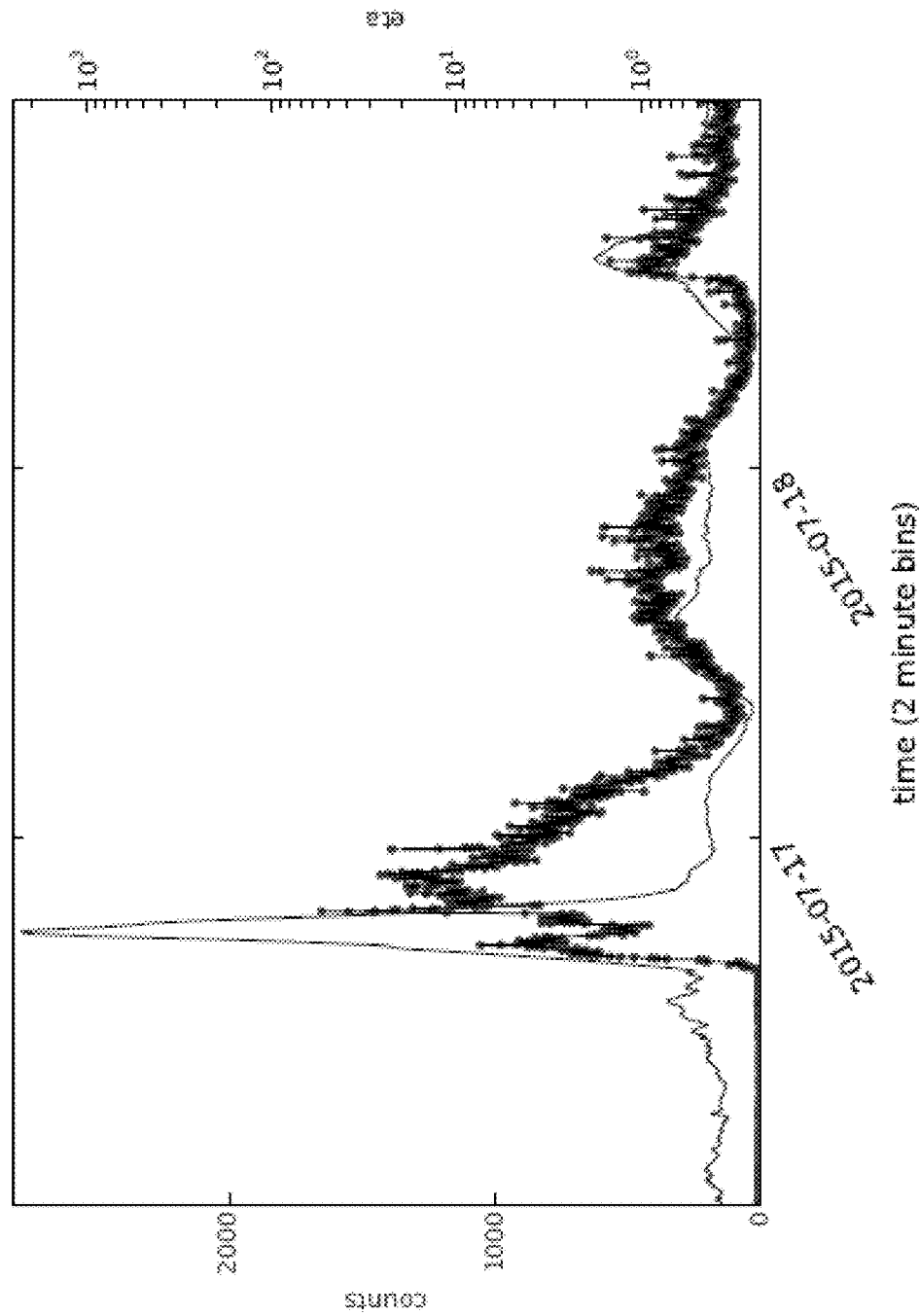
FIG. 7 is an example plot of a single element of R+, along with the $\eta$ as calculated for the time series, in accordance with one or more aspects of the present disclosure.

To demonstrate the performance of this technique on a known trend, FIG. 7 shows a plot of a single element of R+, along with η as calculated for this time series. Data from a trending time series are plotted in black with black dots, for 2-minute time intervals. Based on a library of 500 reference trends in R+ and 500 reference non-trends in R−, the figure of merit η is calculated for each point and plotted in a separate plot. In this example, the length of the elements of R is 300 minutes, while the length of the tested sub-series s is 230 minutes. For distance calculations, the data is smoothed over a 10-minute window. As can be seen, the η curve rises dramatically soon after the real spike in the data, with the lag time demonstrating the effect of the data-smoothing.

One problem with this method is the need for a labeled set of reference time series. To obtain similar detection performance over a broad range of trend shapes and sizes, it is also important to apply a series of transformations to all r and s. In our implementation, these transformations include the previously-mentioned unit normalization, a smoothing with an average taken over a sliding window, and a logarithmic scaling (see [3] for details of the transformations). Examples of the transformed reference time series are shown in FIG. 8.

Figure 8:
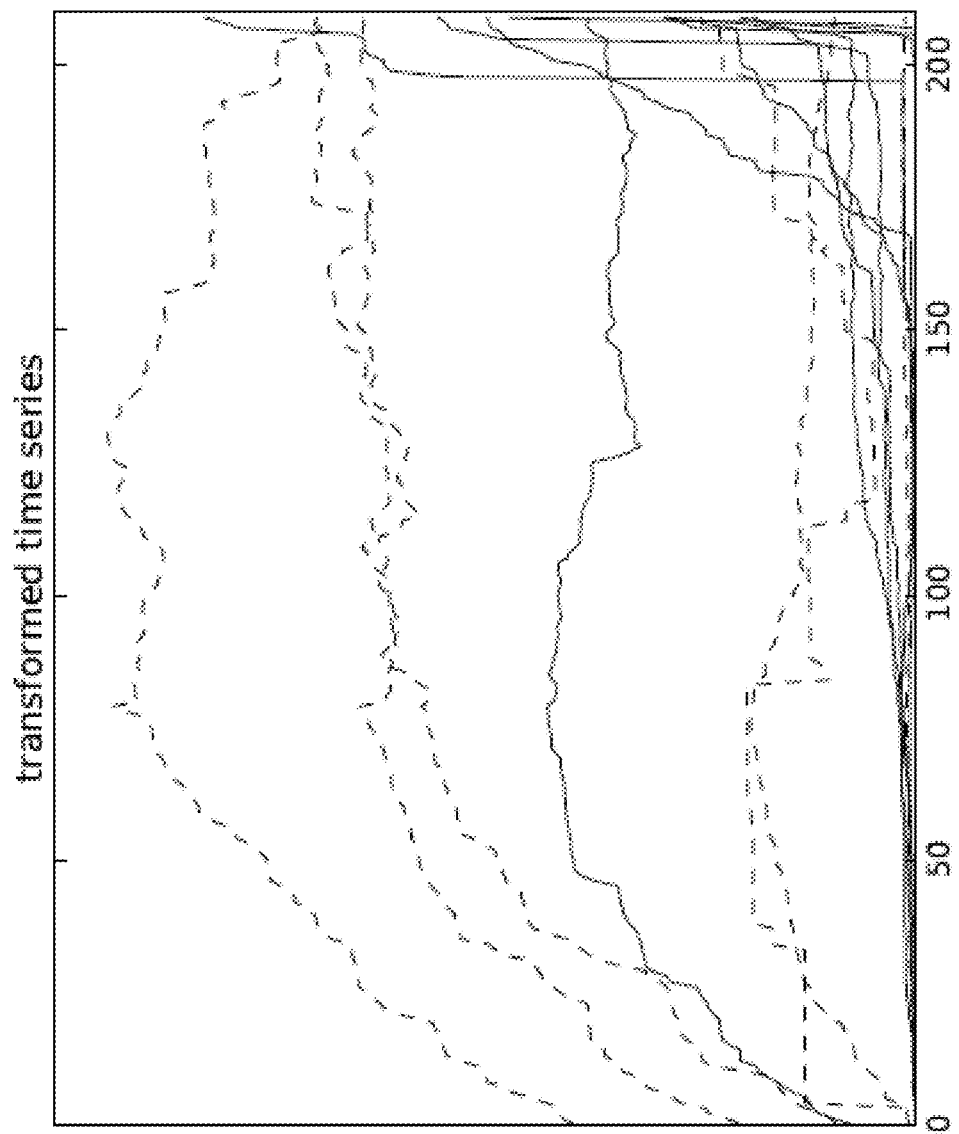
FIG. 8 illustrates an example plot of elements of R+ (black lines) and R− (black dashed lines), after smoothing and scaling, in accordance with one or more aspects of the present disclosure.

FIG. 8 illustrates a plot of elements of R+ (black lines) and R− (black dashed lines), after smoothing and scaling, in accordance with one or more aspects of the present disclosure. As can be seen in FIG. 8, the trending series in R+ rises sharply at the right side of the plot, while changes in series in R− are more evenly distributed.

Even though the shapes of the labeled time series provide the model for trending and non-trending time series, the analyst still controls the performance of the algorithm by setting parameter values. The values chosen for the scaling parameter, the lengths of s and r, the time series precision, and any other transformation parameters lead directly to the true-positive and false-positive metrics. With the labeled reference series in hand, one can easily calculate these metrics by removing random test sets of elements from R+ or R− and running these series through the analysis.

Figure 9:
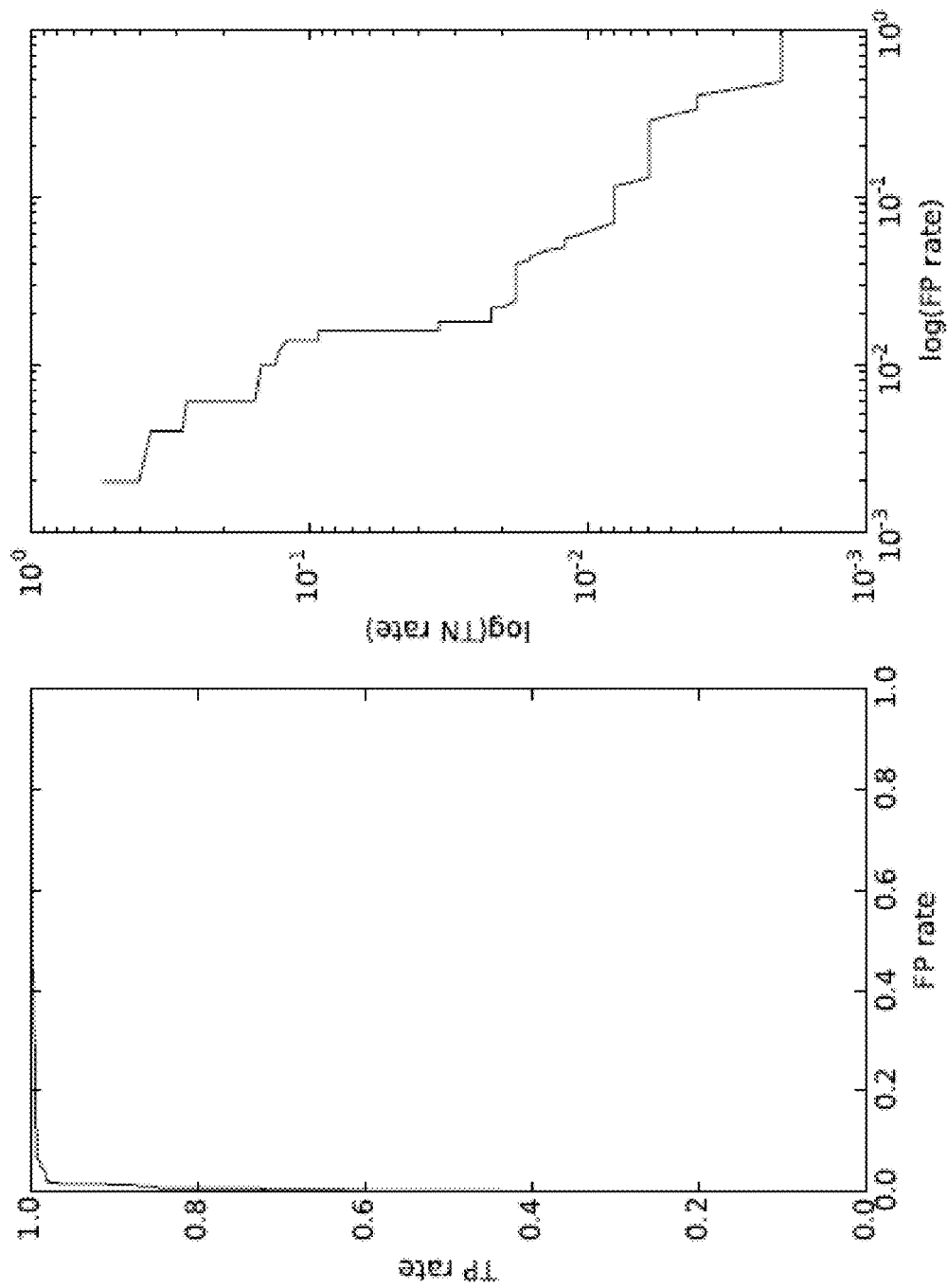
FIG. 9 is an example plot of the Receiver Operating Characteristic curve for variations in $\theta$ over a particular set of algorithm parameters, in accordance with one or more aspects of the present disclosure.

FIG. 9 is a plot of the Receiver Operating Characteristic curve for variations in θ over a particular set of algorithm parameters. To highlight the details, the right figure plots the logarithm of the true-negative rate, instead of the true positive rate. FIG. 9 illustrates a performance analysis conducted by fixing all parameters except for θ, where θ is the critical value of η that defines the split between trends and non-trends. This produced a time series of η values for a set of 100 known trending time series and 100 known non-trending time series, all independent from the 500 trending and 500 non-trending time series used as the references series (R). By applying variations in θ to the η values from the test series, an analyst can trace out a Receiver Operating Characteristic (ROC) curve in the true-positive rate (TPR)/false-positive rate (FPR) space. This curve is shown in two forms in FIG. 9, and represents the quality of the classification. The large area under the ROC curve indicates that this technique, with an appropriate set of parameter values, can simultaneously provide high TRP and low FPR.

In another approach, linear regression is used to characterize a data series. Linear regression attempts to model the relationship between two variables by fitting a linear equation to observed data. One variable is considered to be an explanatory variable, and the other is considered to be a dependent variable. In one example approach, trend analytics module 116 treats counts (such as counts of mentions, hashtags, followers, friends, links or any other quantity that can be counted over time) as the dependent variable and time as the explanatory variable. In one example approach, trend analytics module 116 fits a line to the data using a least squares approach and then looks for deviations from that line to reach a threshold. In other example approaches, lack of fit or a penalized least squares function may be used to fit the data to a line. Linear regression tends to work better over longer time periods.

Once the detection scheme is defined, anomalous events have to be interpreted and acted on as they are observed. These actions can take the following forms:
  alerting—start paying attention to something new and urgent
  informing—note the relative state of things available when someone checks
  discovery—iterative refinement for novel detections or root cause analysis
  model building—enable downstream consumption of the signal for other modeling purposes Given these challenges and considerations, analysis can be organized around three classes of anomalies: ramp-up, mean shift and pulse. While anomalous decreases in time series can be interesting, this discussion will be limited to the specific case of atypical increases.

Ramp-up: from a well-understood steady state (negligible, constant, or periodic), the time series exhibits a continuing increase that is sustained over many instances of the time resolution.

Mean shift: from a well-understood steady state, the mean of the time series shifts abruptly to a significantly different value and maintains that value over a time span much longer than the time resolution.

Pulse: from a well-understood steady state, the value of a time series increases significantly, then returns to previously-typical values. Pulses with widths similar to the time resolution capture the briefest events that can be observed. Those with widths much larger than the time resolution represent extended events that can be further characterized by the area under the pulse.

It should be known that there is some interrelation between these basic anomaly types. For example, a pulse can be thought of as a pair of mean shift or ramp-up/ramp-down anomalies. A higher-level feature like a cycle can also be thought of as a sequence of these anomalies.

Another challenge is the mapping between anomalies and real-world events. The word "event" can refer to a nameable change (e.g. Superbowl mentions), but it can also refer to any interval in a time series that is sufficiently atypical, with no meaning attached. In the remainder of this discussion, the word "event" is used to refer to specific, nameable happenings in the either the online or the offline world. Identifying and characterizing atypical behavior in social data time series can be difficult, but it provides new insights into group behavior and the interplay between the online and the offline world.

As shown in FIG. 1, in one example approach, information distribution system 112 provides a graphical user interface 129 to content provider system 124 that identifies one or more hashtags or other such counts that are trending. The graphical user interface may also include demographic data 120 of users associated with the hashtags having trending scores that satisfy a threshold. In some examples, the graphical user interface may allow a content provider to upload, submit or otherwise provide targeted content 122 stored in targeted content storage 126 to information distribution system 112. The graphical user interface 129 may also allow a content provider to submit a bid or price that the content provider is willing to pay to have targeted content of the content provided displayed to client devices of users associated with the hashtag. Information distribution system 112 may provide the graphical user interface 129 to content provider system 124 as a web application (e.g., one or more web pages), a mobile application (e.g., an application executable by a mobile computing device), or a desktop application (e.g., an application executable by a desktop computing device), to name only a few examples.

Figure 10:
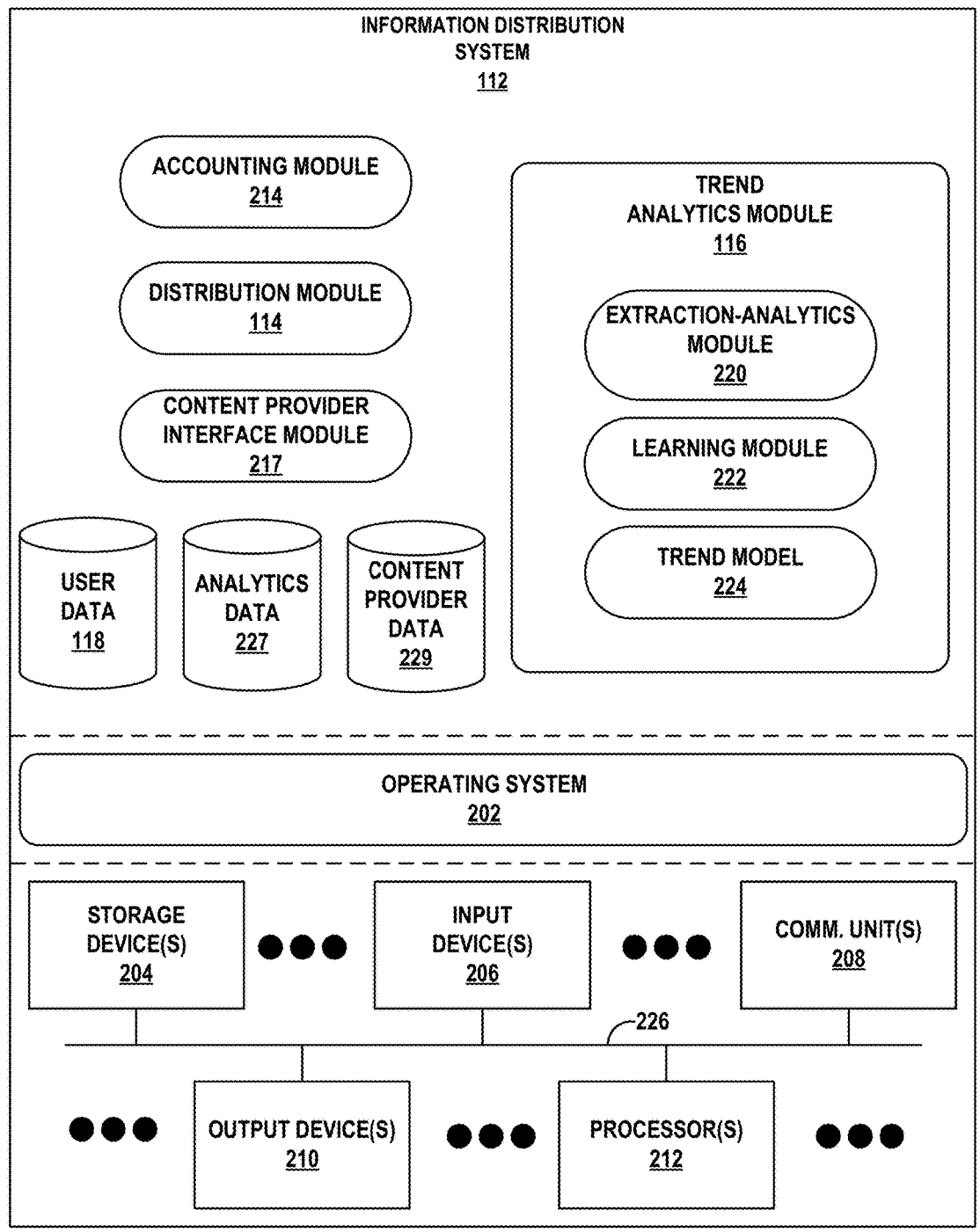
FIG. 10 is a block diagram illustrating further details of an example information distribution system for detecting magnitudes of trends in user-generated content and facilitating the delivery of targeted content based on demographic data of the users associated with the user-generated content, in accordance with one or more aspects of the present disclosure.

FIG. 10 is a block diagram illustrating further details of an example information distribution system for detecting trends in user-generated content, in accordance with one or more aspects of the present disclosure. Information distribution system 112 of FIG. 10 is described below within the context of FIG. 1. FIG. 10 illustrates only one particular example of information distribution system 112, and many other examples of information distribution system 112 may be used in other instances and may include a subset of the components included in example information distribution system 112 or may include additional components not shown in FIG. 1.

As shown in the example of FIG. 10, information distribution system 112 includes accounting module 214, distribution module 114, content provider interface module 217, trend analytics module 116, user data 118, analytics data 227, content provider data 229, operating system 202, one or more storage devices 204, one or more input devices 206, one or more communication units 208, one or more output devices 210, one or more processors 212, and one or more communication channels 226. Trend analytics module 116 includes extraction-analytics module 220, learning module 222, and trend model 224.

Communication channels 226 may interconnect each of the components 202-227 for inter-component communications (physically, communicatively, and/or operatively). In some examples, communication channels 226 may include a system bus, a network connection, an inter-process communication data structure, or any other method for communicating data.

One or more input devices 206 of information distribution system 112 may receive input and one or more input devices 206 may generate output. Examples of input are tactile, audio, and video input and examples of output are tactile, audio, and video output. In one example, input devices 206 include a presence-sensitive display, touch-sensitive screen, mouse, keyboard, voice responsive system, video camera, microphone, or any other type of device for detecting input from a human or machine. Whereas in one example, output devices 210 include a presence-sensitive display, sound card, video graphics adapter card, speaker, cathode ray tube (CRT) monitor, liquid crystal display (LCD), or any other type of device for generating output to a human or machine.

One or more communication units 208 may allow information distribution system 112 to communicate, via one or more wired and/or wireless networks, with external devices and/or systems. For example, communication units 208 may transmit and/or receive network signals being transmitted and received other devices and/or systems connected to network 128. Examples of communication units 208 include network interface cards (e.g. such as an Ethernet card), optical transceivers, radio frequency transceivers, GPS receivers, or any other type of device that can send and/or receive information via a network. Other examples of communication units 208 may include long and short wave radios, cellular data radios, wireless network radios, as well as universal serial bus (USB) controllers.

One or more storage devices 204 of information distribution system 112 may store information or instructions that information distribution system 112 processes during operation of information distribution system 112. For example, storage devices 204 may store data that modules or components may access during execution at information distribution system 112. In some examples, storage devices 204 are temporary memories, meaning that a primary purpose of storage devices 204 is not long-term storage.

Storage devices 204 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 204 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage devices 204, in some examples, include one or more computer-readable storage media. In some examples, storage devices 204 represent non-transitory computer readable storage medium that store instructions later executed by one or more processors 212 during operation of information distribution system 112. For example, storage devices 204 may store program instructions and/or information (e.g., data) associated with modules and/or components 214, 114, 217, 116, 22, 222, 224, 118, 227, 229, and 202.

One or more processors 212 may implement functionality and/or execute instructions within information distribution system 112. For example, processors 212 on information distribution system 112 may receive and execute instructions stored by storage devices 204 that execute the functionality of modules 214, 114, 217, 116, 220, 222, 224, and 202. The instructions executed by processors 212 may cause information distribution system 112 to read/write/etc. information, such as one or more data files at user data 118 and/or analytics data 227 and stored within storage devices 204 during program execution. Processors 212 may execute instructions of modules 214, 114, 217, 116, 220, 222, 224, and 202 to cause information distribution system 112 to perform the operations described in this disclosure. That is, modules 214, 114, 217, 116, 220, 222, 224, and 202 may be operable by processors 212 to perform various actions or functions of information distribution system 112, for instance, detecting magnitudes of trends in user-generated content and facilitating the delivery of targeted content, in accordance with one or more aspects of the present disclosure.

As shown in FIG. 10, information distribution system 112 includes accounting module 214. Accounting module 214 may operate auctions for distributing targeted content to client devices for particular hashtags. For instance, in response to trend analytics module 116 determining that a trending score for a particular hashtag satisfies a threshold, trend analytics modules 116 may send a notification to accounting module 214 that indicates the particular hashtag.

Accounting module 214 may receive bids from one or more content provider systems to distribute targeted content for the particular hashtag. In some examples, accounting module 214 may determine a highest bid or price from a set of bids, and select the targeted content associated with the highest bid. Accounting module 214 may store a record that indicates the bid price and the content provider in content provider data 229. In some examples, content provider data 229 may further include information about content providers, such as but not limited to: name, address, email, phone number, and payment information. Accounting module 214 may debit an account and/or generate a bill for the content provider for the cost of distributing the targeted content based on the bid price. In some examples, accounting module 214 may communicate with one or more payment processing systems, such as banks, payment card companies and the like, to obtain payment and transfer of funds for the cost of distributing the targeted content. In some examples, accounting module 214 may receive one or more counts of the number of users that viewed and/or clicked on (e.g., selected) targeted content that was distributed to one or more client devices. Accounting module 214 may compute the cost of distributing the targeted content based on the one or more counts of the number of users that viewed and/or clicked on targeted content.

In some examples, information distribution system 112 may include a content provider interface (CPI) module 217. CPI module 217 may generate one or more graphical user interfaces that may be displayed at content provider systems. In some examples, CPI module 217 may provide one or more Representational state transfer (RESTful) interfaces, web services, or other application programming interfaces that may send and receive information with content distribution systems. In some examples, CPI module 217 may send alerts or notifications to content provider systems 124 as described in FIG. 1 based on trends detected by trend analytics module 116.

In some examples CPI module 217 may generate, store, and send one or more web pages that provide one or more graphical user interfaces for content providers. For instance, CPI module 217 may generate and send demographic data, trending information, hashtag information, and other information, in web pages to content provider systems for display via GUI 129. As such, CPI module 217 may provide a "portal" or "dashboard" through which content providers may interact with information distribution system 112. CPI module 217 may also receive data from content providers, including but not limited to: targeted content, bids to distribute targeted content, alert/notification preferences, criteria for setting thresholds to name only a few examples. CPI module 217 may also receive user input from content provider systems that specifies where and/or how (e.g., shape, size) targeted content will be displayed within a graphical user interface of a client device.

For instance, CPI module 217 may provide a one-click campaign setup graphical user interface in which a content provider can select target content to target an audience of users associated with the particular hashtag. The one-click setup may include presenting a set of potential instances of targeted content from which a content provider may select a particular instance of targeted content to distribute to one or more users associated with the particular hashtag. CPI module 217 may also authenticate content providers that attempt to access information distribution system 112 based on credentials that are stored in content provider data 229.

In one example approach, CPI module 217 provides a graphical user interface in which a content provider determines trends hidden in social data using the data models discussed above. In one such approach, a content provider searches for trends in social data by manipulating the data model parameters discussed above. For instance, the content provider might want to see if tweets related to a branded product rise or fall on particular days of the year, or at certain times of the day so as to target more receptive audiences, gage the effectiveness of advertising campaigns, or detect consumer concerns with branded products.

CPI module 217 may generate a graphical user interface that includes a set of the top-N trends detected. In some examples, N may be set by an operator of information distribution system 112 or by a content provider at content provider system 124. As an example, CPI module 217 may send a content provider a set of top 10 trending hashtags or top 10 trending counts of mentions, followers or friends. In one example, trend analytics module 116 tracks, for instance, the top 10 subject matters in linked user content such as videos and that trend is sent to content providers via CPI module 217.

More complex data can be studied, as well. For instance, it can be interesting to identify the frequency of terms in tweets versus the number of tweets having the term. The frequency of a term in a tweet can indicate the level of relevance the term has in the tweet. A trend can be detected in a measure of the frequency of particular terms in tweets versus the frequency of tweets with such terms. Similarly, a measure of the frequency of particular subjects in links versus the frequency of links with such subjects is also be a prime area for trend detection. Other parameters such as the demographics of the tweeter can be used as well to filter for and detect trends within groups of users.

As shown in FIG. 10 information distribution system 112 also includes distribution module 114 and trend analytics module 116 as previously described in FIG. 1. Trend analytics module 116 may also include one or more of extraction-analytics modules 220, a learning module 222, a trend model 224, and analytics data 227, each of which are described in further detail in FIG. 3.

Techniques of the disclosure have been described with respect to determining one or more ways to detect trends in social data. In some examples, techniques of the disclosure may be adapted and/or generalized to determining metrics for media, such as images, videos, and/or audio content and generating trending scores for the media. For instance, trend analytics module 116 may determine one or more metrics, for a particular image that is being shared, re-shared, and/or read. The metrics may be same as described with respect to hashtags in this disclosure, except that the metrics are based on messages and/or user content that include the particular image. To determine messages and user content that are associated with the particular image, trend analytics module 116 may perform one or more image recognition techniques on messages and user content to identify messages and user content that include the particular image. Similarly, audio and video recognition techniques may be applied to audio and video content to identify user content and message that include the same audio or video content. In the case of an image, trend analytics module may extract data from messages and user content that include the image, compute one or more metrics (e.g., velocity of the image, acceleration of the image, influence of users sharing and/or re-sharing the image, and the like) and determine a trending score based on the metrics.

Figure 11:
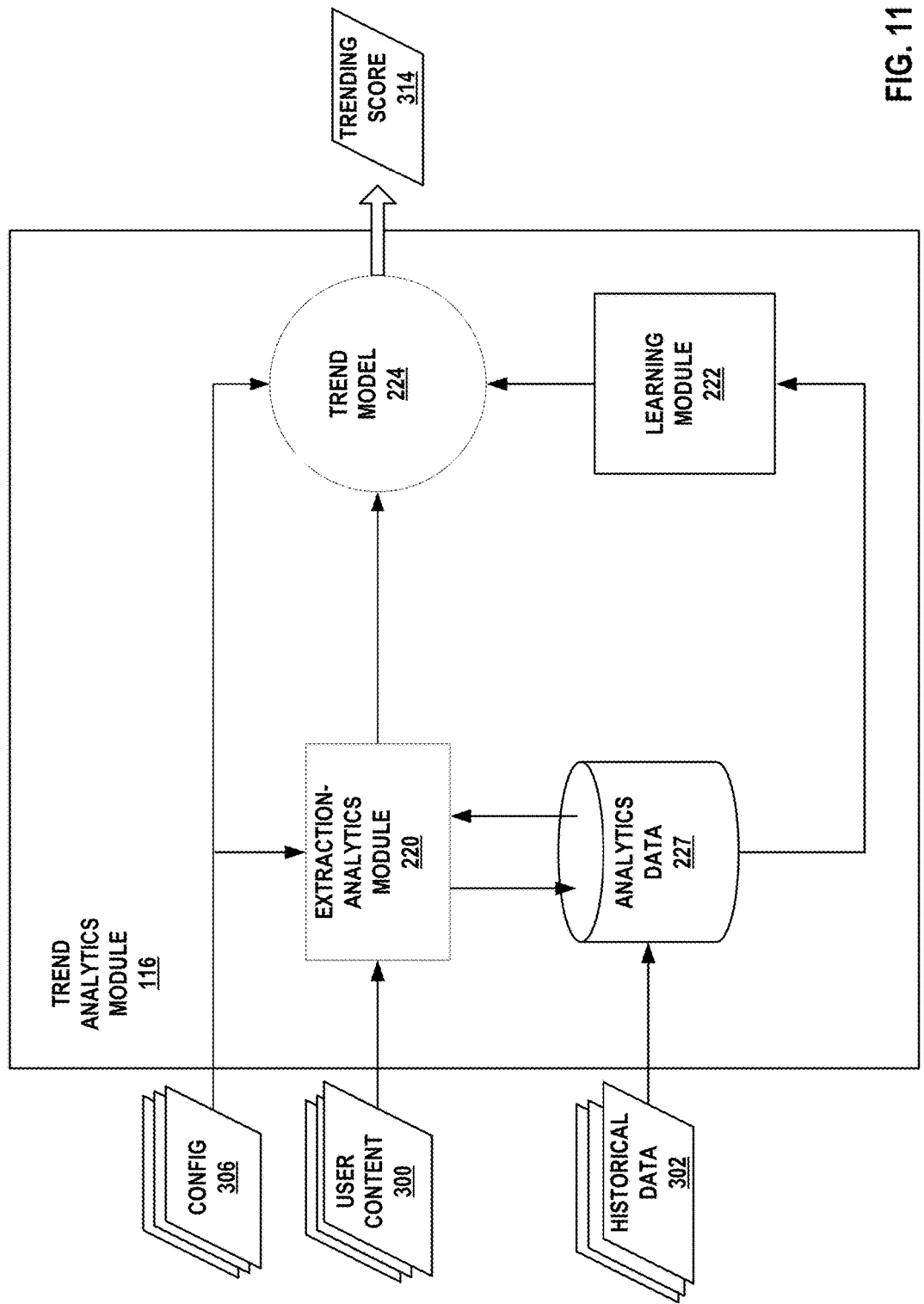
FIG. 11 is a conceptual diagram of a module for detecting magnitudes of trends in user-generated content, in accordance with one or more techniques of the disclosure.

FIG. 11 is a conceptual diagram of a module for detecting magnitudes of trends in user-generated content, in accordance with one or more techniques of the disclosure. Trend analytics module 116 of FIG. 11 is further described below within the context of FIGS. 1 and 10. FIG. 11 illustrates only one particular example of trend analytics module 116, and many other examples of trend analytics module 116 may be used in other instances and may include a subset of the components included in example trend analytics module 116 or may include additional components not shown in FIG. 10 or 11.

In some example approaches, trend analytics module 116 may use machine learning to receive a set of metrics and provide, as output, a trending score. Trend analytics module 116 may use supervised and/or reinforcement learning to train a model that generates a trending score for a countable parameter based on a set of metrics that are input to the model. To generate a trending score using machine learning techniques, trend analytics module 116 may include extraction-analytics module 220, trend model 224, learning module 222, and analytics data 227.

Extraction-analytics module 220 may receive user content 300. In some examples, extraction-analytics module 220 receives user content from user data 118 and/or distribution module 114, as shown in FIG. 1. For instance, user content 300 may be an example of user content 108, as shown in FIG. 1. Extraction-analytics module 220 extracts data from user content 300 to compute one or more metrics as described in FIG. 1. For instance, extraction-analytics module 220 may receive a message and identify the particular hashtag associated with the message, the number of mentions of the message, the number of friends or followers associated with the message or any other countable parameter. Extraction-analytics module 220 may extract data from the message, such as the user that shared or re-shared the message, user content (e.g., text, images, videos, audio), mentions of other users, whether the message includes media, whether the message includes a URL or link, if the message is a re-share then the original author, the number of followers and/or active followers of the user that shared or re-shared the message, to name only a few examples of data extracted from the metrics to compute various metrics.

In some examples, extraction-analytics module 220 may store the extracted data, representations of the extracted data, and/or statistics of extracted data in analytics data 227. In some examples, analytics data 227 may store time information for the extracted data. Using the stored data of analytics data 227 extraction-analytics module 220 may compute one or more metrics. For instance, analytics data 227 may store, for a particular hashtag, a particular number of mentions, the number of friends or followers, or other countable parameter, a count of the number of shared, re-shared and/or read messages associated with the particular countable parameter. Based on the count of the number of messages associated with the particular countable parameter, extraction-analytics module 220 may compute, as one metric, a velocity of the parameter over a particular time duration. In this way, extraction-analytics module 220 extracts data from user content 300, and may store the data for use in computing one or more metrics.

Trend analytics module 116 includes a trend model 224 that generates a trending score based on the trend models detailed above. In one example approach, module 116 selects a model for trend detection that strikes a balance between simplicity, speed, accuracy, and precision. In some example approaches, module 116 selects between a point-by-point Poisson technique, a cycle-corrected Poisson technique, a data-driven trend detection technique and linear regression to detect a trend based on social media data. In one such example approach, module 116 selects the point-by-point Poisson technique when simplicity is important, or for a pilot model. Such an approach is appropriate for small sets of time series, in which typical behavior can be manually observed and correlated with the atypicality parameter ($\eta$).

If a sufficient history of data is available, trend analytics module 116 selects a technique enhanced to account for cyclic behavior, as in the cycle-corrected Poisson technique. Such an approach requires a relatively small step up in complexity, and may provide a significantly decreased rate of false positive signals.

In one example approach, trend detection module 116 selects a data-driven method when optimal true-positive and false-positive rates are worth extra model complexity and technical commitment. While it is potentially difficult to collect and label a sufficient number of comparison time series, the technique may provide stable results across a wide variety of trend detection problems. Finally, when computing a trend over longer time scales, linear regression provides computationally simple trend detection.

In some examples, a trending score 314 may be an integer value, non-integer value (e.g., rational number), or discrete value. In the case of an integer or rational number, trend model 224 may output a trending score 214 in a range of trending scores. The range of trending scores may include a minimum and maximum value. In one example, a minimum value may be −1 and a maximum value may be 1. In other examples, a minimum value may be 0 and a maximum value may be 10. Any suitable range of values may be used. In some examples, trending score 314 may be selected from a discrete set of values, such as High, Medium, Low. (Trending score 314 may also be referred to as a trending value.)

In some examples, trend model 224 is trained by learning module 222 using supervised and/or reinforcement learning techniques. Trend model 224 may be implemented using any number of models for supervised and/or reinforcement learning, such as but not limited to, an artificial neural networks, a decision tree, naïve Bayes network, support vector machine, or k-nearest neighbor model, to name only a few examples. In some examples, learning module 222 initially trains trend model 224 based on a training set of metrics and corresponding trending scores. The training set may include a set of feature vectors, where each feature in the feature vector represents a value for a particular metric. Each feature vector may also have a corresponding trending score. By training trend model 224 based on the training set, trend model 224 may be configured by learning module 222 to generate larger trending scores for feature vectors that include metrics that correspond to trends with higher magnitudes. In the same way, trend model 224 is configured by learning module 222 to generate lower trending scores for feature vectors that include metrics that correspond to trends with lower magnitudes. Accordingly, trend model 224 may be trained, such that upon receiving a feature vector of metrics, trend model 224 may output a trending score that indicates a magnitude of a trend for a particular hashtag.

In some examples, a computer such as information distribution system 112, content provider system 124 or client device 102 receives the trending score and analyzes the detected trend in order to tie the trend to particular events.

In accordance with techniques of the disclosure, extraction-analytics module 220 may select data for a particular countable parameter from analytics data 227 and compute one or more or more metrics, such as a parameter count, that are stored in a feature vector. Trend model 224, upon receiving the feature vector, determines a trending score 314, which represents a magnitude of a trend for the particular countable parameter. Using the trending score, trend analytics module 116 may determine whether the trending score satisfies a threshold. If the trending score satisfies the threshold, trend analytics module 116 notifies content provider system 124, as described in this disclosure.

Trend analytics module 116 may generate, and input or apply, feature vectors to trend model 224 periodically, such as according to a schedule or a particular time interval. In other examples, trend analytics module 116 may input feature vectors in real-time as user content 300 is received and processed by extraction-analytics module 220. In still other examples, trend analytics module 116 may asynchronously generate, and input or apply, feature vectors to trend model 224. For instance, trend analytics module 116 may determine that an asynchronous event such as a user input has occurred or that a criterion is satisfied, and input or apply feature vectors to trend model 224.

In some examples, trend analytics module 116 may receive historical data 302. In some examples, learning module 22 may use historical data 302 to perform online learning. Online learning may refer to learning module 222 training trend model 224 based on historical data, training data or training examples. For example, a background model derived from data similar to the point being tested can be used to remove cyclic effects from the trend data as noted in the discussion of the cycle-corrected Poisson model above. In some examples, training trend model 224 undergoes online training while trend model 224 is in use to generate trend scores, rather than only training trend model 224 with an initial training set.

In some examples, historical data 302 includes data associated with various countable parameters that indicate how a trend actually grew. Trend analytics module 116 may store historical data in analytics data 227. For instance, historical data 302 may include one or more actual metrics and one or more actual trending scores that were generated by trend model 224 and that correspond to the actual metrics. In some examples, historical data 302 may indicate one or more actual metrics and one or more actual trending scores at numerous different points in time. Learning module 222 may determine whether, for a particular trending score, a magnitude of a trend for a particular hashtag actually increased or decreased by an amount proportional to or reflected in the magnitude of the trending score.

Figure 12:
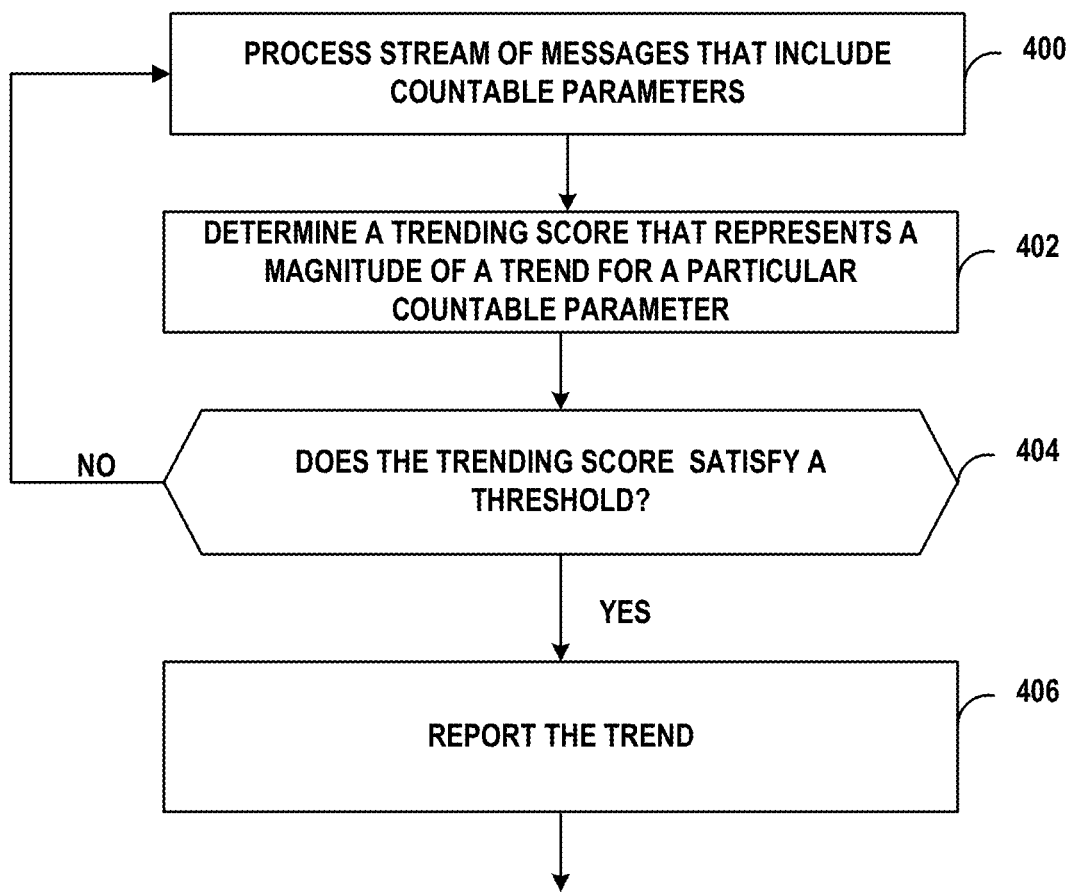
FIG. 12 is a flow diagram illustrating example operations of a computing device that implements techniques for detecting trends in user-generated content, in accordance with one or more aspects of the present disclosure.

FIG. 12 is a flow diagram illustrating example operations of a computing device that implements techniques for detecting trends in user-generated content, in accordance with one or more aspects of the present disclosure. For purposes of illustration only, the example operations are described below within the context of information distribution system 112, as shown in FIGS. 1 and 10.

As shown in FIG. 12, information distribution system 112 may receive and process a stream of messages composed by users of the client devices (400). In the example of FIG. 12 one or more of the messages may include a particular countable parameter such as a hashtag. For instance, as described in FIG. 1, users of one or more client devices may share, re-share, and/or read messages that include user content. The client devices may send the messages to information distribution system 112 for further processing in accordance with techniques of the disclosure. For instance, as described in FIG. 11, information distribution system 112 may extract, and in some instances, store data from the messages to determine one or more metrics.

Information distribution system 112 may determine, using the one or more metrics that are based at least in part on the messages, the measure of a trend. In one approach the measure of a trend is a trending score that represents a magnitude of a trend for a particular countable parameter (402). In one example approach, measuring a trend included receiving, by the trend analytics module 116, a time series having a plurality of instances of social data, wherein the instances of social data share a countable parameter and, for each of a number of bins, counting, by the computing device, occurrences of one or more of the countable parameters in each instance of social data assigned to that bin.

For instance, information distribution system 112 may generate a feature vector that includes a set of metrics that are usable to generate a trending score. The set of metrics may include counts of countable parameters by bin and information distribution system 112 may include a trend model, that has been trained with a training set of metrics and trending scores, that receives the set of metrics. The trend model may generate a trending score that indicates a magnitude of a trend for the particular hashtag or other countable parameter. In some example approaches, information distribution system 112 selects a trend detection model by selecting between one or more of a point-by-point Poisson technique, a cycle-corrected Poisson technique, a data-driven trend detection technique and a linear regression technique.

Information distribution system 112 may determine whether the trending score for the particular countable parameter satisfies a threshold (404). If the trending score does not satisfy the threshold ("NO" branch of 404), information distribution system 112 continues to process the stream of messages that include one or more hashtags (400). If the trending score satisfies threshold ("YES" branch of 404), information distribution system 112 reports the trend (406). As described in FIG. 1, such a report may include, in addition, to the notice, analysis that aggregates, summarizes, or divides the demographic data for users associated with the particular countable parameter across dimensions, such as age, gender, geographic location, type of client device(s) of user, web browser/operating system of client device(s), history of content generated by the user, history of content read and/or followed by a user, hashtags and/or mention tags used by the user, to name only a few examples.

Figure 13:
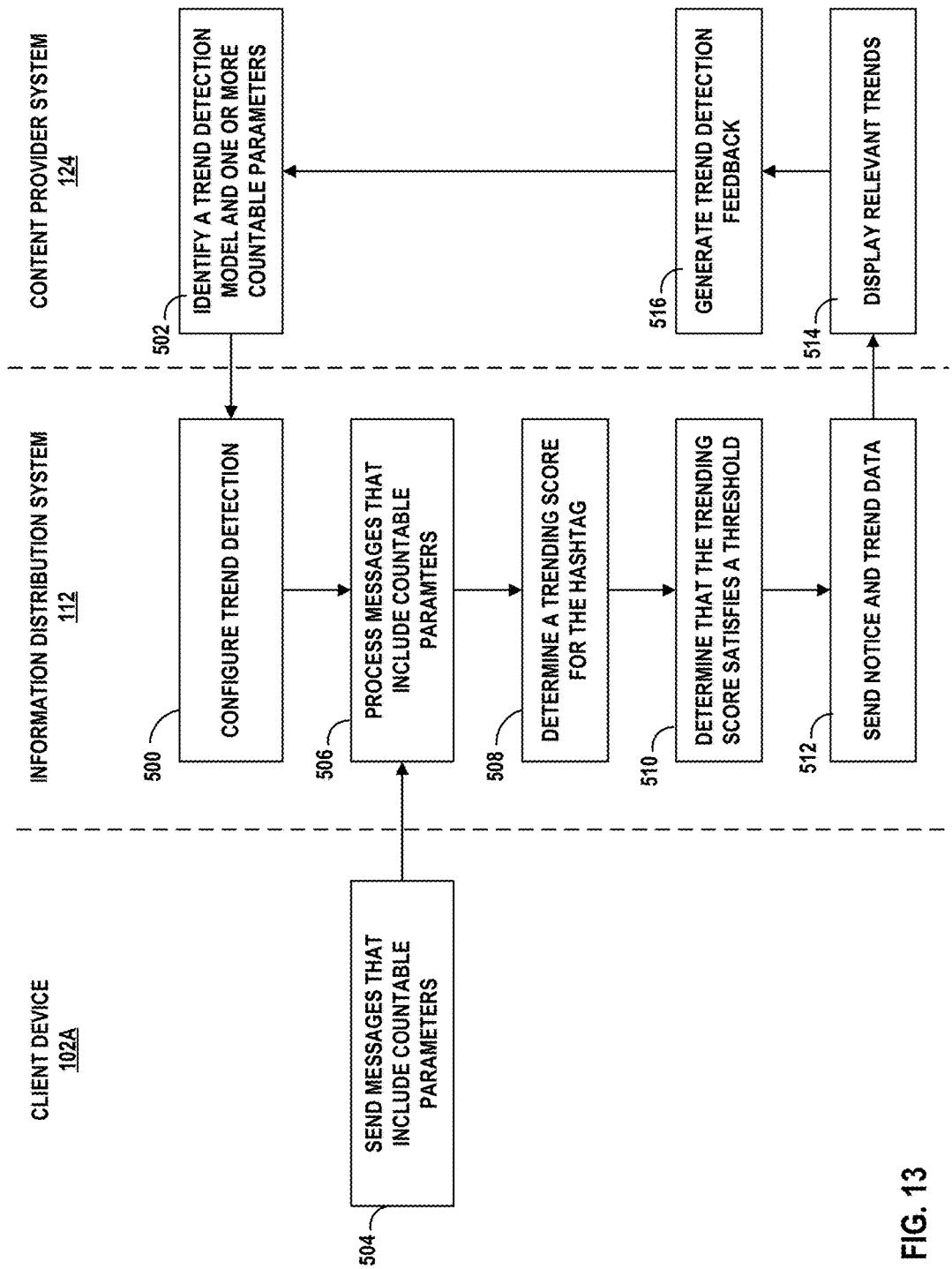
FIG. 13 is a flow diagram illustrating example operations of an information distribution system, a client device and a content provider system, in accordance with one or more aspects of the present disclosure.

FIG. 13 is a flow diagram illustrating example operations of an information distribution system 112, a client device 102A, and a content provider system 124, in accordance with one or more aspects of the present disclosure. For purposes of illustration only, the example operations are described below within the context of information distribution system 112, client device 102A, and content provider system 124, as shown in FIGS. 1 and 10.

As shown in FIG. 13, information distribution system 112 configures trend analytics module 116 for trend detection (500). In some examples, content provider system 124 provides input to this process by identifying a trend detection model, parameters for the trend detection model and one or more parameters to be counted (502). In the example shown in FIG. 13, one or more client devices, such as client device 102A, send messages that include user content as described in FIG. 1 to information distribution system 112 (504). For instance, a user may share or re-share a message, and client device 102A may send a message that includes user content or data to re-share the message. In some examples, the message may include one or more hashtags or other countable parameters. Information distribution system 112 may receive and process the message from client device 102A (506). As part of processing the message, information distribution system 112 may extract and store data from the messages to determine one or more metrics. For example, information distribution system 112 may generate one or more metrics as described in FIG. 11, such as counts, velocity, acceleration, and nodality for the hashtag or for other countable parameters, to name only a few examples.

As noted above in the discussion of FIG. 12, information distribution system 112 may determine a measure of a trend at 502, using one or more metrics that are based at least in part on messages. In one approach the measure of a trend is a trending score that represents a magnitude of a trend for one or more countable parameters (402). In one example approach, measuring a trend included receiving, by information distribution system 112, a time series having a plurality of instances of social data, wherein the instances of social data share a countable parameter and, for each of a number of bins, counting, by the computing device, occurrences of one or more of the countable parameters in each instance of social data assigned to that bin. In some example approaches, the count is used to generate a trend graph associated with the countable parameter. In one such example approach, when an element of the trend graph exceeds a predefined threshold, a trend is noted.

Information distribution system 112 may determine, using the one or more metrics that are based at least in part on the messages, a trending score that represents a magnitude of a trend for the particular countable parameter (508). For instance, information distribution system 112 may generate a set of metrics that are usable to generate a trending score. Information distribution system 112 may apply the set of metrics to a trend model. The trend model may generate a trending score that indicates a magnitude of a trend for the particular countable parameter. Information distribution system 112 may determine that the trending score satisfies a threshold (510). In some examples, the trending score may satisfy the threshold when the score is greater than or equal to the threshold. In some examples, the trending score may satisfy the threshold when the score is less than or equal to the threshold. In some examples, the trending score may satisfy the threshold when the score is equal to the threshold.

Information distribution system 112, in response to determining that the trending score satisfies the threshold, may send a notice with the trending score and, in some cases, trend data, to one or more content provider systems, such as content provider system 124 (512). For instance, information distribution system 112 may, as part of the notice, provide a graph of the trend and provide demographic information associated with the messages contributing to the trend. In some case, information distribution system may aggregate, summarize, or divide the demographic data for users associated with the particular hashtag across any one or more dimensions. Content provider system 124 may receive the demographic data. In some examples, the content provider may generate or otherwise select targeted content for users associated with the particular hashtag. In this way, a content provider of content provider system 124 may select targeted content to the audience described by the demographic data. Content provider system 124 may send the targeted content to information distribution system 112. In some examples, as described in FIG. 1, content provider system 124 may also send a bid or price that the content provider is willing to pay the operator of the information communication system 112, if the targeted content is sent for display at client devices 102 of one or more users associated with the particular trending parameter.

In some examples, content provider system includes an interface used to display the graph of the trend and to select parameters for the trend detection model in order to capture other trends (514). In some such examples, a content provider uses GUI 129 of content provider system 124 to configure the trend detection model, or to select an alternate trend detection model, to process future social media streams based on the trend data received (516).

In some examples, information distribution system 112 includes an interface used to display the graph of the trend and to select parameters for the trend detection model in order to capture other trends. In some such examples, an analyst uses a graphical user interface of information distribution system 112 to configure the trend detection model, or to select an alternate trend detection model, to process future social media streams.

Trends in social data tell us about what is important to users of social media. Trends not only reflect real-world events, but also drive online behavior. By identifying trending behavior, we can be informed of current events, we can discover emerging events, and we can model future events. Reliable, precise, and fast trend detection, however, is often made difficult by the size and diversity of the social data corpus, along with the large variations in the time and volume scales of social data sets.

Example techniques of trend detection that strike various balances between simplicity, speed, accuracy, and precision have been described herein. In certain cases, where simplicity may be important, or for a pilot model, the point-by-point Poisson technique may be used. This technique is appropriate to small sets of time series, in which typical behavior can be manually observed and correlated with the atypicality parameter ($\eta$). If a sufficient history of data is available, this technique may be enhanced to account for cyclic behavior, as in the cycle-corrected Poisson technique. This may be a relatively small step up in complexity, and may provide a significantly decreased rate of false positive signals.

When optimal true-positive and false-positive rates are worth extra model complexity and technical commitment, a data-driven method may be used. While it is potentially difficult to collect and label a sufficient number of comparison time series, the technique may provide stable results across a wide variety of trend detection problems. Finally, linear regression is computationally simple, but may operate better over longer time scales.

In one or more examples, the functions described above may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, compact disc read-only memory (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples have been described. These and other examples are within the scope of the following claims.

The invention claimed is:

1. A method comprising:
  receiving, by a computing device, a set of historical time series of social data;
  labeling, by the computing device, each of the set of historical time series of social data as trending or non-trending;
  selecting, by the computing device, and based on the set of historical time series of social data, a trend detection model;
  receiving, by the computing device, a time series having a plurality of instances of social data, wherein the instances of social data share a countable parameter;
  for each of a number of bins, counting, by the computing device, occurrences of one or more of the countable parameters in each instance of social data assigned to that bin;
  determining, by the computing device, based at least in part on the trend detection model, on the count for each bin, and on the set of historical time series of social data and the one or more instances of social data in the time series of social data that correspond to a particular event, a measure of a trend associated with the countable parameter;
  determining, by the computing device, a distance between at least one historical time series of the trend detection model and the time series of social data that corresponds to the particular event;
  determining, by the computing device, based at least in part on the distance and a scaling parameter, a particular weight;
  determining, by the computing device, a trending value based on a trending score generated using the particular weight, the trending value representing a ratio of a first aggregation of weights and a second aggregation of weights, wherein:
    the first aggregation of weights is based on a first plurality of weights, the first plurality of weights based at least in part on one or more historical time series of social data labeled as trending,
    the second aggregation of weights is based on a second plurality of weights, the second plurality of weights based at least in part on one or more historical time series of social data labeled as non-trending, and
    the particular weight is included in at least one of the first aggregation of weights or the second aggregation of weights;
  implementing cycle-correction to the measure of the trend, based on pattern information associated with respective time data associated with each of the one or more historical time series of social data labeled, as trending to obtain a cycle-corrected measure of the trend;
  determining, by the computing device, that the cycle-corrected measure of the trend satisfies a trend threshold; and
  responsive to determining that the cycle-corrected measure of the trend satisfies the trend threshold, outputting, by the computing device, at least one indication of the detected trend.

2. The method of claim 1, wherein the method further comprises associating the trend with an event.

3. The method of claim 1, wherein the computing device is a first computing device, wherein outputting the at least one indication of the detected trend comprises at least one of:
  sending, by the first computing device and to a second computing device of a user, a notification that indicates the detected trend;
  providing, by the first computing device, a graphical user interface that indicates the detected trend; or
  sending, by the first computing device and to a third computing device that analyzes detected trends for particular events, the indication of the detected trend.

4. The method of claim 1, further comprising:
  determining, by the computing device and based on a plurality of previous instances of social data that correspond to the countable parameter, an expected count of instances of social data; and
  determining, by the computing device, an actual count of the one or more instances of social data in the time series of social data,
  wherein determining the measure of the trend includes determining, by the computing device, a trending score based at least in part on the expected count and the actual count for each bin.

5. The method of claim 4,
  wherein the expected count of instances of social data is based on a time period in a first day, and
  wherein the actual count of instances of social data is based on the same time period in a second day.

6. The method of claim 1, further comprising:
  storing, by the computing device and in the trend detection model, each of the labeled historical time series of social data as a set of time series of historical social data.

7. The method of claim 1, wherein each respective instance of social data in the time series of social data indicates at least one of: text of a social media communication, a count of mentions in a social network for the respective event, one or more hashtags of a social media communication, one or more users following the respective event in a social network, one or more friends of a user in a social network associated with the instance of social data, one or more hyperlinks, or a time-dependent quantity that is countable over time.

8. The method of claim 1, wherein the trend detection model includes a parameter, and wherein the parameter modifies at least of:
 a time difference between a first time that a real-world event occurs and a second time that a detection of the real-world event occurs in the social data;
 a fraction of identified trends that are not statistical false positives; or
 a fraction of real-world trends, which are detected by the model that indicates the likelihood of a trend.

9. The method of claim 1, wherein the detected trend represents at least one of:
 a continuing increase in a quantity of instances of social data that correspond to a particular event, wherein the continuing increase follows a prior steady state in the quantity of instances of social data that correspond to the particular event;
 an increase in the quantity of instances of social data that correspond to a particular event within a first defined time duration, which is greater than a threshold, wherein the increase follows the prior steady state in the quantity of instances of social data that correspond to the particular event; or
 an increase in the quantity of instances of social data within a second defined time duration that is greater than a threshold, followed by a decline in the quantity of instances of social data within the second defined time duration, wherein the increase follows the prior steady state in the quantity of instances of social data that correspond to a particular event.

10. The method of claim 1, wherein selecting a trend detection model includes receiving, from a content provider, an indication of the trend detection model to select, and wherein outputting at least one indication of the detected trend includes transmitting a trend notice and trend data to the content provider.

11. The method of claim 1, wherein selecting the trend detection model comprises selecting the trend detection model from a plurality of available trend detection models, wherein each respective available trend detection model of the plurality of available trend detection models includes a respective plurality of trend values distributed over time, and wherein each trend value is a function of the count from two or more bins.

12. A computing device comprising:
 at least one processor; and
 at least one non-transitory computer-readable storage medium storing instructions that are executable by the at least one processor to:
  receive a set of historical time series of social data;
  label each of the set of historical time series of social data as trending or non-trending;
  select, based on the set of historical time series of social data, a trend detection model;
  receive a time series having a plurality of instances of social data, wherein the instances of social data share a countable parameter;
  for each of a number of bins, count occurrences of one or more of the countable parameters in each instance of social data assigned to that bin;
  determine, based at least in part on the trend detection model, on the count for each bin, and on the set of historical time series of social data and the one or more instances of social data in the time series of social data that correspond to a particular event, a measure of a trend associated with the countable parameter;
  determine a distance between at least one historical time series of the trend detection model and the time series of social data that corresponds to the particular event;
  determine, based at least in part on the distance and a scaling parameter, a particular weight;
  determine a trending value based on a trending score generated using the particular weight, the trending value representing a ratio of a first aggregation of weights and a second aggregation of weights, wherein:
   the first aggregation of weights is based on a first plurality of weights, the first plurality of weights based at least in part on one or more historical time series of social data labeled as trending,
   the second aggregation of weights is based on a second plurality of weights, the second plurality of weights based at least in part on one or more historical time series of social data labeled as non-trending, and
   the particular weight is included in at least one of the first aggregation of weights or the second aggregation of weights;
  implement cycle-correction to the measure of the trend, based on pattern information associated with respective time data associated with each of the one or more historical time series of social data labeled, as trending to obtain a cycle-corrected measure of the trend;
  determine that the cycle-corrected measure of the trend satisfies a trend threshold; and
  responsive to the determination that the cycle-corrected measure of the trend satisfies the trend threshold, output at least one indication of the detected trend.

13. The computing device of claim 12, wherein the instructions further include instructions that are executable by the at least one processor to transmit a trend notice to a content provider system responsive to determining that the cycle-corrected measure of the trend satisfies the trend threshold.

14. The computing device of claim 12, wherein the instructions further include instructions that are executable by the at least one processor to transmit a trend notice and trend data to a content provider system responsive to determining that the cycle-corrected measure of the trend satisfies the trend threshold.

15. The computing device of claim 12, wherein the instructions further include instructions that are executable by the at least one processor to transmit a trend notice and trend data to a content provider system responsive to determining that the cycle-corrected measure of the trend satisfies the trend threshold, and to receive, from the content provider system, parameters for the trend detection model.

16. The computing device of claim 12, wherein the instructions further include instructions that are executable by the at least one processor to transmit a trend notice and trend data to a content provider system responsive to determining that the cycle-corrected measure of the trend satisfies the trend threshold, and to receive, from the content provider system, an indication of the trend detection model to select.

17. A non-transitory computer-readable storage medium encoded with instructions that, when executed, cause at least one processor of a computing device to:

receive a set of historical time series of social data;

label each of the set of historical time series of social data as trending or non-trending;

select, based on the set of historical time series of social data, a trend detection model;

receive a time series having a plurality of instances of social data, wherein the instances of social data share a countable parameter;

for each of a number of bins, count occurrences of one or more of the countable parameters in each instance of social data assigned to that bin;

determine, based at least in part on the trend detection model, on the count for each bin, and on the set of historical time series of social data and the one or more instances of social data in the time series of social data that correspond to a particular event, a measure of a trend associated with the countable parameter;

determine a distance between at least one historical time series of the trend detection model and the time series of social data that corresponds to the particular event;

determine, based at least in part on the distance and a scaling parameter, a particular weight;

determine a trending value based on a trending score generated using the particular weight, the trending value representing a ratio of a first aggregation of weights and a second aggregation of weights, wherein:

the first aggregation of weights is based on a first plurality of weights, the first plurality of weights based at least in part on one or more historical time series of social data labeled as trending, the second aggregation of weights is based on a second plurality of weights, the second plurality of weights based at least in part on one or more historical time series of social data labeled as non-trending, and the particular weight is included in at least one of the first aggregation of weights or the second aggregation of weights;

implement cycle-correction to the measure of the trend, based on pattern information associated with respective time data associated with each of the one or more historical time series of social data labeled, as trending to obtain a cycle-corrected measure of the trend;

determine that the cycle-corrected measure of the trend satisfies a trend threshold; and responsive to the determination that the cycle-corrected measure of the trend satisfies the trend threshold, output at least one indication of the detected trend.

18. The non-transitory computer-readable storage medium of claim 17, wherein the instructions further include instructions that, when executed, cause the at least one processor of the computing device to:

determine, based on a plurality of previous instances of social data that correspond to the countable parameter, an expected count of instances of social data; and determine an actual count of the one or more instances of social data in the time series of social data, and wherein the instructions that, when executed, cause the at least one processor of the computing device to determine the measure of the trend include instructions that, when executed, cause the at least one processor of the computing device to determine a trending score based at least in part on the expected count and the actual count for each bin.

19. The non-transitory computer-readable storage medium of claim 17, wherein the instructions that, when executed, cause the at least one processor of the computing device to determine the measure of the trend associated with the countable parameter include instructions that, when executed, cause the at least one processor of the computing device to apply a trend analysis based on a cycle-corrected Poisson technique.

20. The non-transitory computer-readable storage medium of claim 17, wherein the instructions that, when executed, cause the at least one processor of the computing device to select the trend detection model include instructions that, when executed, cause the at least one processor of the computing device to:

receive, from an external device, an indication of the trend detection model to select; and select the trend detection model at least in part based on the received indication.

* * * * *